(12) United States Patent
Genoe

(10) Patent No.: US 6,351,268 B1
(45) Date of Patent: Feb. 26, 2002

(54) METHOD AND APPARATUS FOR DISPLAYING THREE-DIMENSIONAL IMAGES

(75) Inventor: Jan Genoe, Messelbroek (BE)

(73) Assignee: Rose Research, L.L.C., Dallas, TX (US)

( * ) Notice: Subject to any disclaimer, the term of this patent is extended or adjusted under 35 U.S.C. 154(b) by 0 days.

(21) Appl. No.: 09/407,692

(22) Filed: Sep. 28, 1999

Related U.S. Application Data

(60) Provisional application No. 60/101,990, filed on Sep. 28, 1998.

(51) Int. Cl.⁷ .................................................. G09G 5/36
(52) U.S. Cl. ........................................ 345/607; 345/32
(58) Field of Search ..................... 345/32, 7–9, 139, 345/607; 348/750, 751, 755, 756; 355/22

(56) References Cited

U.S. PATENT DOCUMENTS

| | | | |
|---|---|---|---|
| 1,260,682 A | | 3/1918 | Kanolt .......................... 352/46 |
| 4,541,007 A | | 9/1985 | Nagata .......................... 348/48 |
| 5,276,478 A | * | 1/1994 | Morton .......................... 355/22 |
| 5,422,653 A | * | 6/1995 | Maguire et al. ................ 345/9 |
| 5,680,171 A | | 10/1997 | Lo et al. ......................... 348/42 |
| 5,724,071 A | * | 3/1998 | Morton et al. ................ 345/207 |
| 5,790,086 A | * | 8/1998 | Zelitt ............................ 345/32 |

FOREIGN PATENT DOCUMENTS

| | | |
|---|---|---|
| EP | 0 847 208 A2 | 6/1996 |
| EP | 0 724 175 A1 | 7/1996 |
| EP | 0 833 184 A1 | 4/1998 |
| EP | 0 859 525 A2 | 8/1998 |
| GB | 541753 | 12/1941 |

OTHER PUBLICATIONS

Burckhardt C., Optimum Parameters and Resolution Limitation of Integral Photography, Journal of the Optical Society of America, V. 58, No. 1, Jan. 1968.

(List continued on next page.)

*Primary Examiner*—Richard Hjerpe
*Assistant Examiner*—Francis Nguyen
(74) *Attorney, Agent, or Firm*—Slater & Matsil, L.L.P.

(57) ABSTRACT

Three dimensional images are generated from a conventional television broadcast signal to which has been added a low bandwidth depth information component. An array of microlenses is placed before the display screen and the microlens array is illuminated with an array of light sources having a periodicity that differs from the periodicity (pitch) of the microlens array. The difference of periodicity between the microlens array and the light sources is a function of the desired depth perception for the object being displayed. For the application to conventional Cathode Ray Tubes, we introduce a tilted opening in the focal plane of the microlens to allow (in a flexible and analog way) any periodicity variation of the lens light source. For the application to Liquid Crystal Displays, we split each pixel in a number of vertical stripes, and a set of stripes is driven in common by a horizontal line driver. Therefore, this technology allows an apparent light source depth variation and as such a realistic three-dimensional television image or computer image, independent of the position of the observer.

26 Claims, 15 Drawing Sheets

OTHER PUBLICATIONS

Hembd, Ch., Stevens, R., & Hutley, M.; Imaging Properties of the 'Gabor Superlens;' Microlens Arrays, European Optical Society Topical Meetings Digest Series: 13; May 15–16, 1997.

Karin, Mohammad A., Electro–Optical Displays, The Center for Electro–Optics, The University of Dayton, Dayton, Ohio, 1992.

Davies, N., & McCormick, M.; The Use of Microlens Arrays in Integral Photography, IOP Publishing Ltd., 1991.

Jequier, Bernard, THeoretical and Practical Problems of Lenticular Screens, IOP Publishing Ltd., 1991.

Hutley, M. C., & Stevens, R. F.; The Formation of Integral Images by Afocal Pairs of Lens Arrays ("Superlenses"), IOP Publishing Ltd., 1991.

* cited by examiner

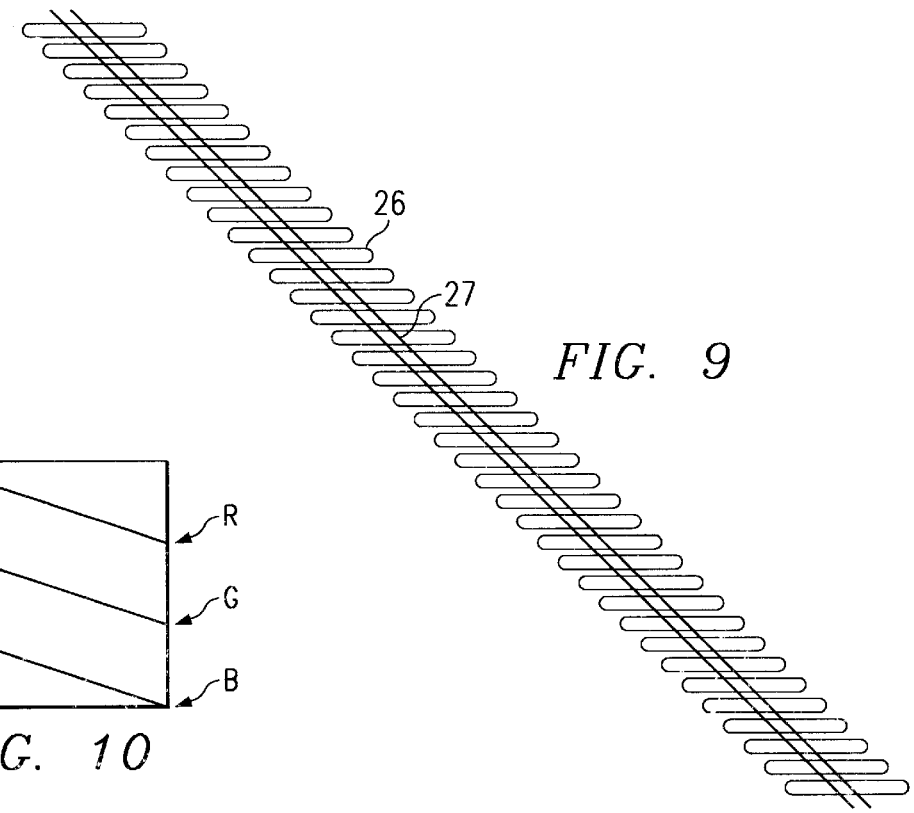
FIG. 9
FIG. 10
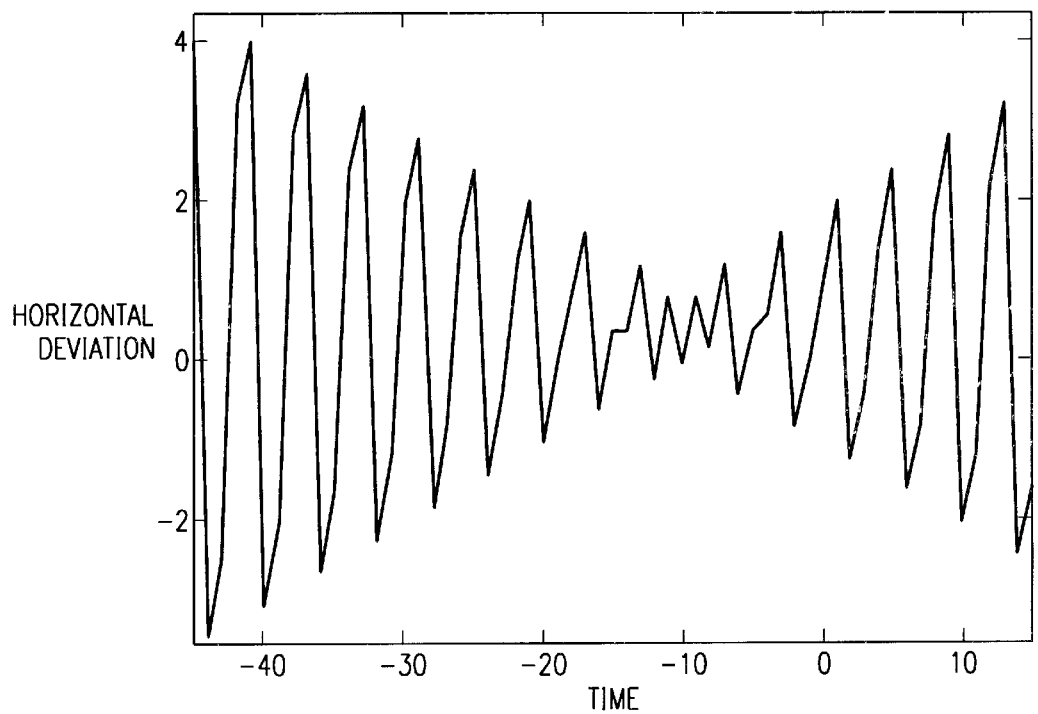
FIG. 11a

METHOD AND APPARATUS FOR DISPLAYING THREE-DIMENSIONAL IMAGES

This application claims benefit of U.S. Provisional Patent Application 60/101,990, filed Sep. 28, 1998, which application is incorporated herein by reference.

FIELD OF THE INVENTION

This invention relates generally to display technology and more particularly to the design and fabrication of three-dimensional television displays and three-dimensional computer displays.

BACKGROUND OF THE INVENTION

Integral photography has proven to be able to reproduce high-resolution three-dimensional images, which exist independently of the observer. This is in contrast to stereoscopic type images where the spatial content only exists in the mind of the observer.

Integral photography stores information in the focal (or equivalent) plane of each microlens containing the amount of light that has to be emitted by this microlens in each separate direction. With such systems, there is indeed a complete image behind each microlens. This technique is adequate for three-dimensional photography, but this technique is not suitable for use in three-dimensional television, due to the high information density that is required to be transmitted.

The bandwidth required to transmit sufficient integral photography data in order to obtain an image with traditional television resolution has been calculated to be on the order of 40.5 GHz (see Burckhardt, "Optimum Parameters and Resolution Limitation of Integral Photography", Journal of the Optical Society of America, Volume 58 (1), 1968, pp 71–76). This bandwidth increases further to the fourth power of the desired screen resolution What is needed in the art, therefore, is a method for generating and reconstructing a three dimensional, high resolution image that can be transmitted using conventional broadcast signals that does not require excessive bandwidth for transmission.

Preferred embodiments of the present invention provide a solution to the disadvantages of the prior art systems and methods. Preferred embodiments of the invention involve a technique that reconstructs the complete information density in the focal plane of each microlens of the microlens array, The system uses normal two-dimensional display information to which has been added depth information for each pixel. The final information density (bandwidth) needed to reconstruct the three-dimensional image using this technique is not substantially higher than the information density needed to reconstruct a two-dimensional image. The described system is constructed such that the signal used for three-dimensional television can be used on a two-dimensional television and that the signal used for two-dimensional television can be used on a three-dimensional television, what is called forward and backward compatibility. This technique allows, as such, a continuous evolution in consumer television from two-dimensional television to three-dimensional television.

SUMMARY OF THE INVENTION

In one aspect, the present invention provides a display device for generating a three-dimensional image from an image signal, the image signal including depth information. The display device comprises an array of microlenses having a first pitch in a first direction and an array of light sources impinging upon the microlens array and having a second pitch in the first direction, the second pitch being variable. The second pitch of the array of light sources varies in response to the depth information of the image signal.

In another aspect, the invention provides for a device comprising a display plate having an array of microlenses thereon, each microlens of the array having a central axis, wherein each microlens of the microlens array has a plurality of illumination locations relative to the central axis of the microlens. Further included is a selection circuit receiving as input depth information corresponding to a given microlens and outputting a selection signal corresponding a desired illumination location for the given microlens and an illumination circuit receiving as input the selection signal and causing in response illumination of the desired illumination location.

BRIEF DESCRIPTION OF THE FIGURES

FIG. 9 illustrates a phosphorous deposition being applied in horizontal stripes;

FIG. 10 illustrates the use of three mask slits for each red, green, and blue component of preferred embodiment pixels;

FIGS. 11a and 11b provide a graphical representation of the horizontal and vertical deviation, respectively, of the scanning electron beam in a preferred CRT embodiment device;

DETAILED DESCRIPTION OF THE INVENTION

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

This present invention provides a method and apparatus for constructing three-dimensional displays from the standard two-dimensional display information and an additional, low bandwidth signal containing the depth information. The underlying fundamentals behind this method are first discussed in the section on microlens arrays. The implementation steps, i.e. the control of the off-axis illumination source of each microlens, the technology used to obtain emission from a set of microlenses combined to obtain one object point, and the control that each object point is visible under all required angles is then discussed for a Cathode Ray Tube (CRT) embodiment and a Liquid Crystal Display (LCD) embodiment. A general description of the apparatus is first provided, however.

Figure 28:
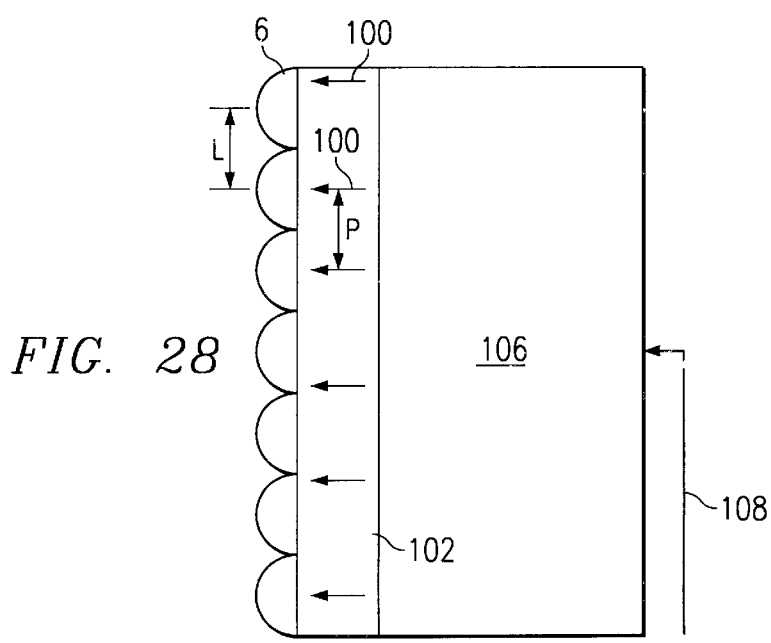
FIG. 28 illustrates a preferred embodiment three dimensional image display device.

Referring to FIG. 28, a preferred embodiment three dimensional display apparatus is shown. The device comprises a microlens array 6 formed on a display screen 102. The microlens array 6 may be integral to the screen 102 or attached thereto. The microlens array preferably comprises a series of vertically oriented, cylindrical microlenses uniformly spaced across the screen 102 with a centerline to centerline pitch, designated as L in FIG. 28. This pitch is preferably fixed, although in some embodiments it may be desirable to have an array having a different pitch in some portions of the array for, e.g. improved viewing angle, to compensate for variations in the screen, and the like.

The microlens array 6 is illuminated by an array of illumination sources 100. The illumination sources 100 are spaced apart by a pitch, designated P, which is different from the pitch L of the microlens array. Illumination control circuitry 106, in response to an image signal 108, will cause the pitch of the illumination sources 100 to change in response to depth information contained within the image signal. As will be discussed in greater detail, below, by selecting the pitch P of the illumination sources relative to the pitch L of the microlens array, and by selecting the number of light sources to be illuminated, an apparent lights source can be constructed that, from the viewer's perspective, appears to originate either behind or in front of the screen.

Figure 1:
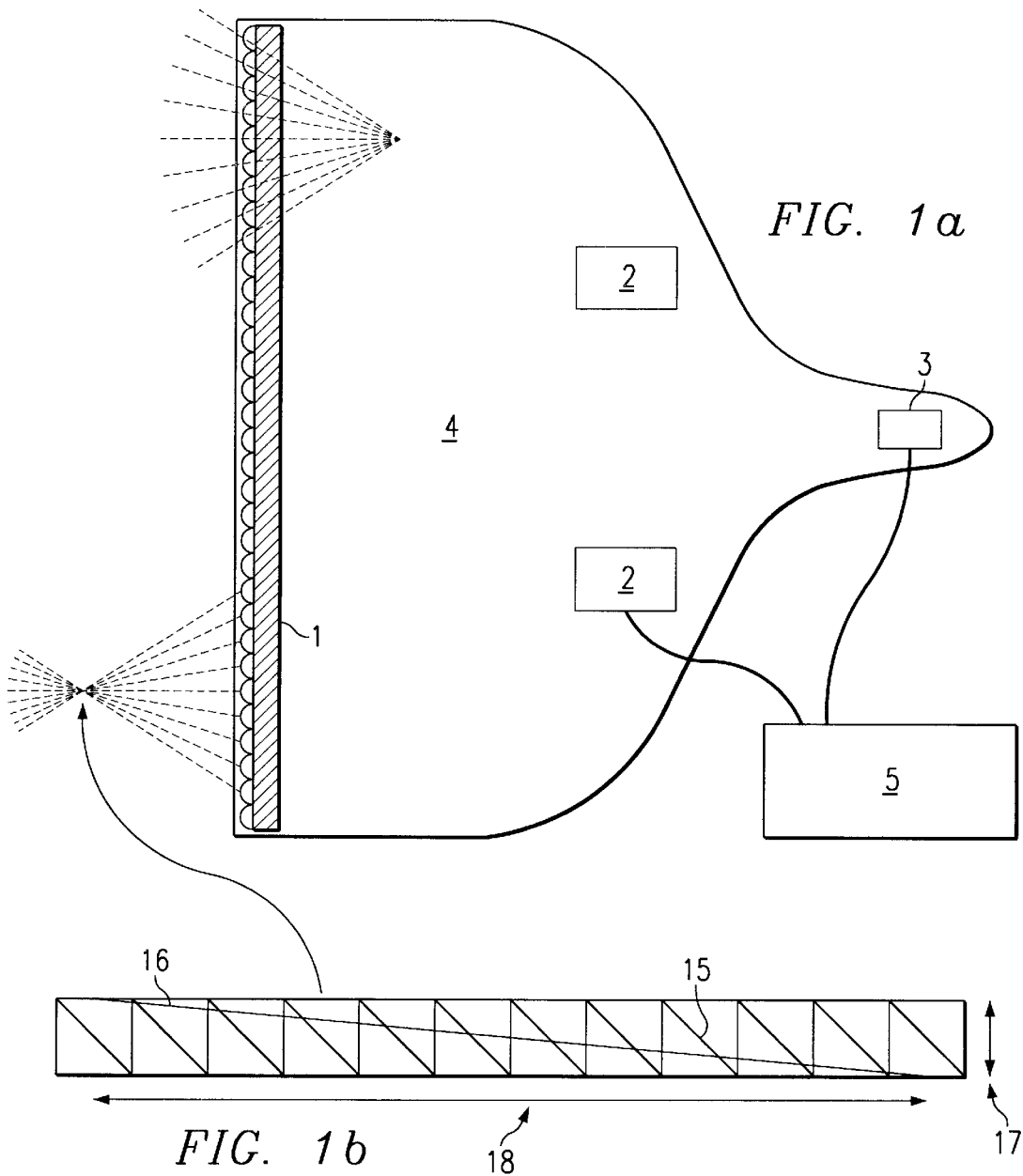
FIG. 1a illustrates a preferred Cathode Ray Tube (CRT) embodiment device.
FIG. 1b illustrates a scan across several pixels in the preferred CRT embodiment device.
Figure 2:
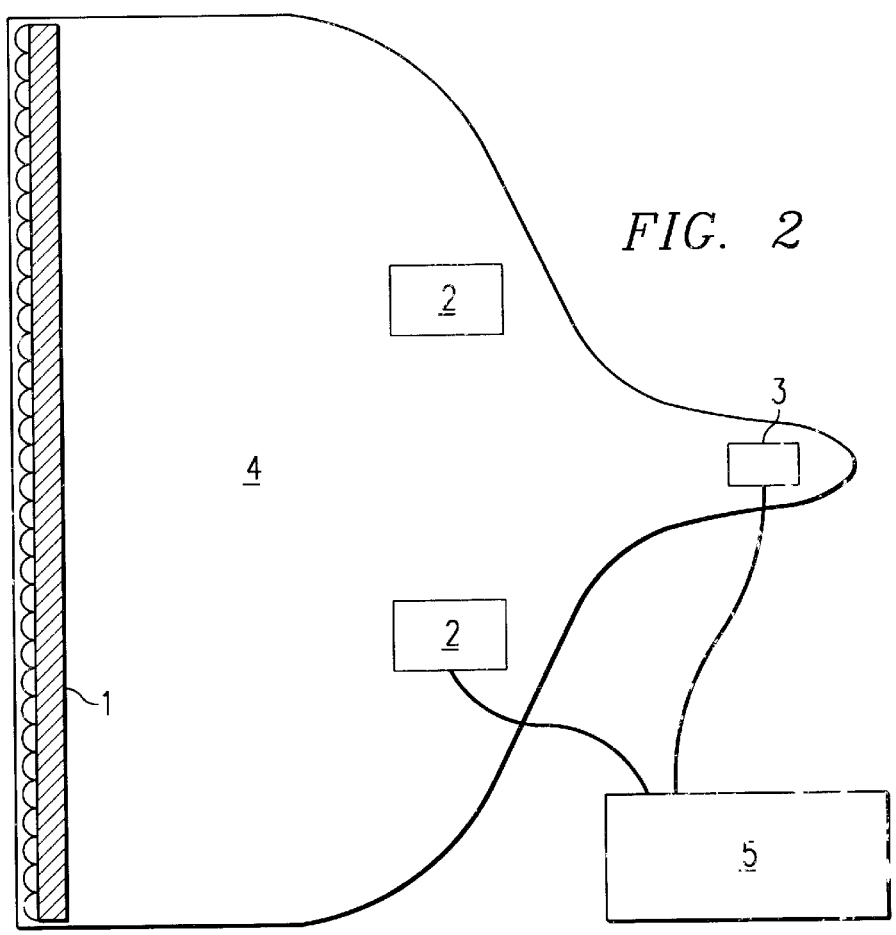
FIG. 2 illustrates a plan view of the preferred CRT embodiment.

An overview of a first preferred Cathode Ray Tube system is shown in FIGS. 1 and 2. The system consists of a microlens display plate (1), an electron beam deviation system (2), and an electron beam emission system (3), all three included in a Cathode Ray Tube (4) and controlled by an electronic control system (5). The microlens display plate (1) consists of a microlens array on one side and a metal layer containing tilted slits on the other side. The electronic control system (5) modulates the deviation of the electron beam and modulates the focus of the electron beam.

Figure 27:
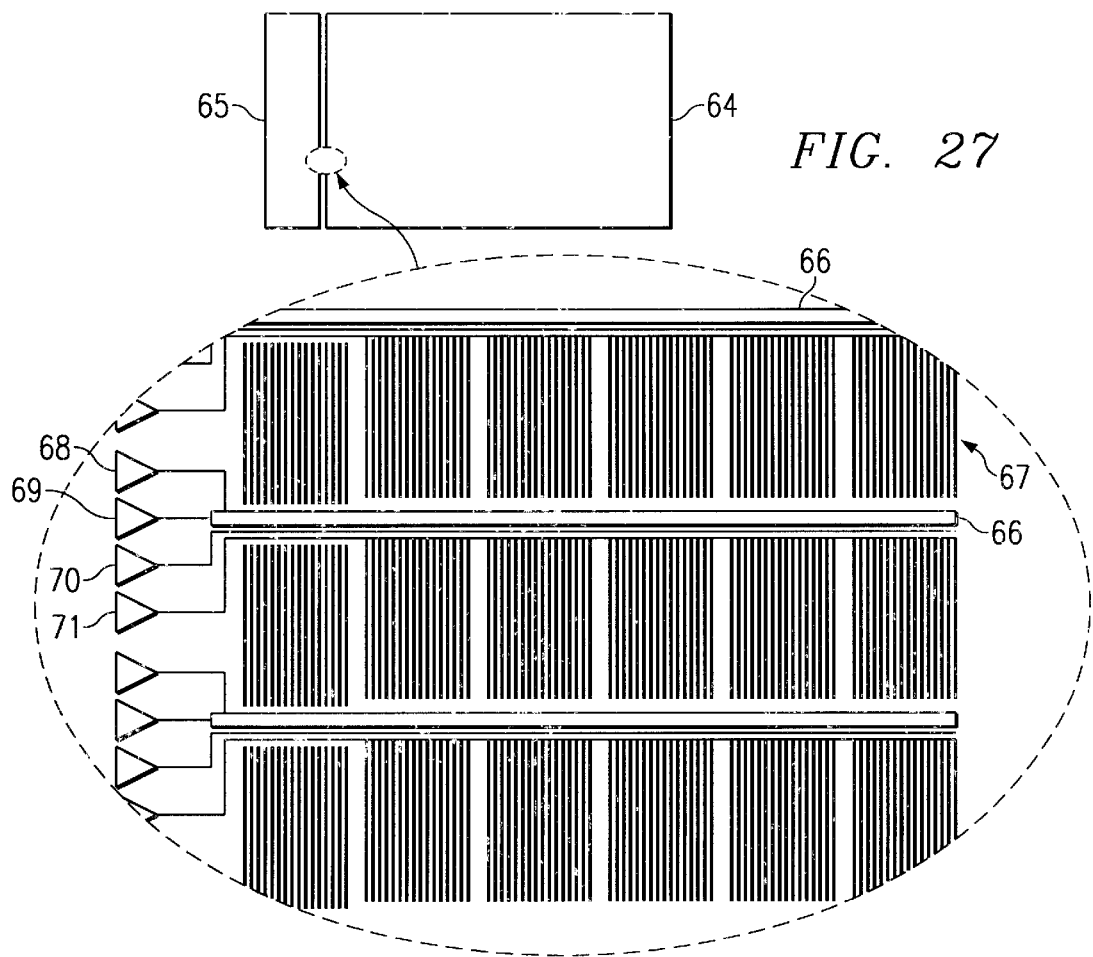
FIG. 27 illustrates a preferred embodiment LCD driving circuit.

An overview of a first preferred embodiment Liquid Crystal Display system is shown in FIG. 27. The system consists of a microlens array deposited on top of a Liquid Crystal Display. Every pixel of the display is split in very small stripes. The driver IC for the display pixels are placed along the vertical border, rather than the horizontal border as is the case in conventional Liquid Crystal Display. A shift register 66 along each horizontal line determines which set of stripes 67 should be selected in order to reconstruct the point at a certain depth.

1. Microlens Array

Certain concepts of the three-dimensional image construction used in the preferred embodiments are similar to the basic concepts of integral photography. In integral photography, an object's image is recorded on a photosensitive film placed close to the focal plane of a microlens array. As such, information about the object is recorded under different angles by the different lenses. After the development of the film, it is placed back at its original position relative the array, and illuminated from the back. A three-dimensional image is hence reconstructed in this manner.

Figure 3A:
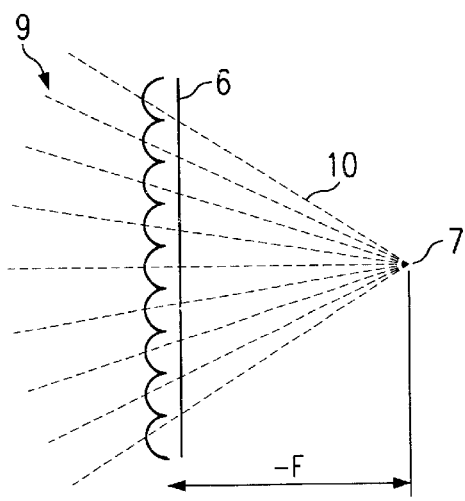
FIGS. 3a and 3b illustrate the construction of an apparent object behind and before the screen, respectively.
Figure 3B:
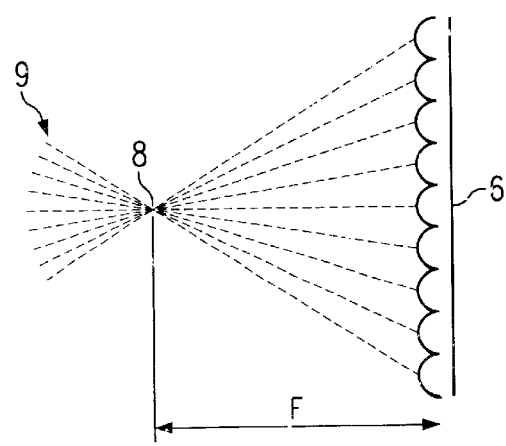

FIG. 3 shows how a microlens array (6) can construct an apparent object (7) behind the screen and an apparent object (8) in front of the screen. The dotted lines (9) represent light beams originating from the microlens array (6). Behind the screen, lines (10) are the imaginary extrapolation of the lines (9) existing in front of the screen. The object point (7) is at a distance F behind the screen and the object point (8) is at a distance F in front of the screen. For clarity, the convention is used that an object distance F is positive if the apparent object (8) is in front of the screen and negative if the apparent object (7) is behind the screen.

1.1. Selection of the Microlens Array System

Traditionally, one uses spherical microlenses in the integral photography. This technique leads to an information density, which increases with the fourth power of the resolution. By the use of cylindrical vertical microlenses, we can reduce the information density to a value proportional to the third power of the resolution of the image, without a substantial difference in the human perception of the created object. Furthermore, as discussed below, by the introduction of a device for parsing out each pixel into a plurality of illumination sources, we reduce the information density to a value proportional to the information density in two-dimensional images. The rationale allowing for the use of cylindrically microlenses is provided in the following paragraph.

In normal human perception, the eyes are maintained at the same height. The horizontal difference in angle seen by both human eyes determines spontaneously the impression of depth. This is called binocular disparity or binocular parallax. Many prior art techniques for creating three-dimensional (3D) images (such as stereo viewers or polarized glasses and switching glasses) are based on creating a different image for each eyes. Moreover, if a human requires additional depth information on an image, he or she will intuitively first try to gain this by a horizontal displacement (i.e. moving the head or the whole body from side to side). Humans do not rely upon vertical displacement for such perception, however. Because humans rely primarily upon horizontal differences in angle to perceive depth, a screen with only cylindrical vertical lenses is sufficient to obtain depth impression.

Figure 4A:
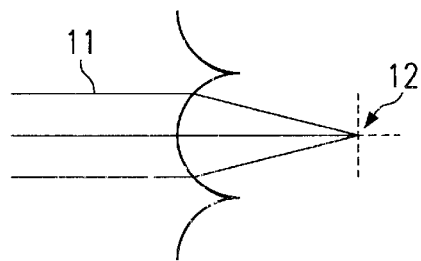
FIGS. 4a and 4b illustrate the effects of illuminating a microlens at its axis and off its central axis, respectively.
Figure 4B:
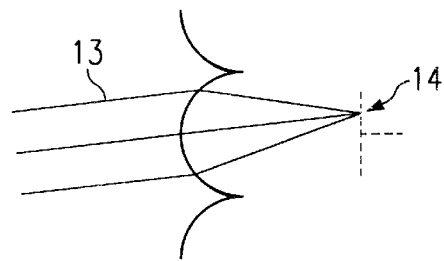

FIGS. 4a and 4b show how a vertical microlens can be used to direct a parallel beam in the horizontal plane. The position where the light is generated in the focal plane of the microlens determines the direction of the light beam. A light beam perpendicular to the screen (11) is obtained when the light is generated in the middle (i.e. at the cylindrical axis) of the microlens, as shown by point (12) and a light beam at a certain angle to the screen (13) is obtained when the light is generated in a spot in the focal plane which is not at the center, as shown by point (14).

The combination of the concepts of FIG. 4 with the concepts of FIG. 3 allows one to construct an apparent object at any depth. The problem becomes one of generating the light source at the correct spots in the focal plane. From the literature on superlenses, it is known that, if a light source in the focal plane of a microlens array with pitch L and focal length $f_L$, has a difference in periodicity $\Delta p$, an apparent object is created at distance F from the screen.

$$F = f_L \left(1 + \frac{L}{\Delta p}\right)$$

Equation 1 Apparent Object as a Function of the Pitch Difference

This implies that by placing the light spots in the focal plane of the microlens array (6) with a periodicity P, which differs from the periodicity (i.e. pitch) of the microlenses (being L) by a value $\Delta p$, an object is created at a distance F from the screen. When $\Delta p$ is larger than zero, an apparent object (8) is created in front of the screen. When $\Delta p$ is smaller than zero, the created apparent object (7) is behind the screen. The absolute value of $\Delta p$ is always smaller than the microlens pitch L, which makes the second term in Equation 1 always larger in magnitude than the first term.

1.2. Fabrication of the Cylindrical Vertical Microlens Arrays.

Various techniques suitable for the fabrication of the microlenses on the transparent plate (1) are known. For instance, Jéquier teaches a method for mechanical ruling to construct the lenses ("Theoretical and practical problems of lenticular Screens", IOP Short meetings Proc 30: Microlens Arrays, 1991, pp 61–65). Alternatively, the array could be fabricated using resist reflow techniques, such as taught by Daly et al. ("The manufacture of microlenses by melting Photoresist, IOP Short meetings Proc 30: Microlens Arrays, 1991, pp 23–34).Other approaches will be apparent to one skilled in the art as will.

Preferably, the microlens size for optimum resolution of images situated between 10 cm before the screen and 20 cm behind the screen is about 300 micron, which also corresponds to typical pixel size of a television screen. This simplifies the design of the system, as the pixel size and the microlens pitch correspond in this technology. This means that there will be one lens of the microlens array before each pixel of the display device (CRT or LCD).

2. The Control of the Off-Axis Illumination Source of each Microlens

As discussed above, depth perception of the image is obtained by positioning the light source off axis from the center of the lens. This off-axis lighting results in the difference in periodicity ($\Delta p$) discussed with reference to Equation 1 above.

2.1. Cathode Ray Tube Embodiment: Metal Layer Containing the Tilted Slits and the Phosphor In the preferred CRT embodiment, the microlens array is present on one side of the transparent plate (1). On the other side of this transparent plate, a metal mask is deposited containing a series of slits. The design and fabrication of these slits is discussed below. In other embodiments, a different material such as ceramic may be substituted for the metal mask. The specific material selected is not essential, provided the material has the necessary properties for manufacture of the system, including withstanding the electron beam bombardment, being patternable to form the slits, being rigid so as not to warp or deform in the high temperature operating environment, and the like.

2.1.1. Selection of the Slits in the Metal Mask.

As discussed in the former section, one needs the generation of light spots with a periodic difference to construct an apparent object point before or behind the screen. This creation of periodic spots needs to be done for each point in the two-dimensional image in order to create the illusion of three dimensions. In other words, for each pixel in the two dimensional image, several light spots must be illuminated on the microlens array in order to create the periodicity difference (between the light spots and the array) to create the appearance that the object (pixel) is being illuminated from either in front of or behind the screen. For this reason, several pixels will actually be illuminated for each pixel of the two dimensional image, as illustrated in FIG. 1b.

Figure 5:
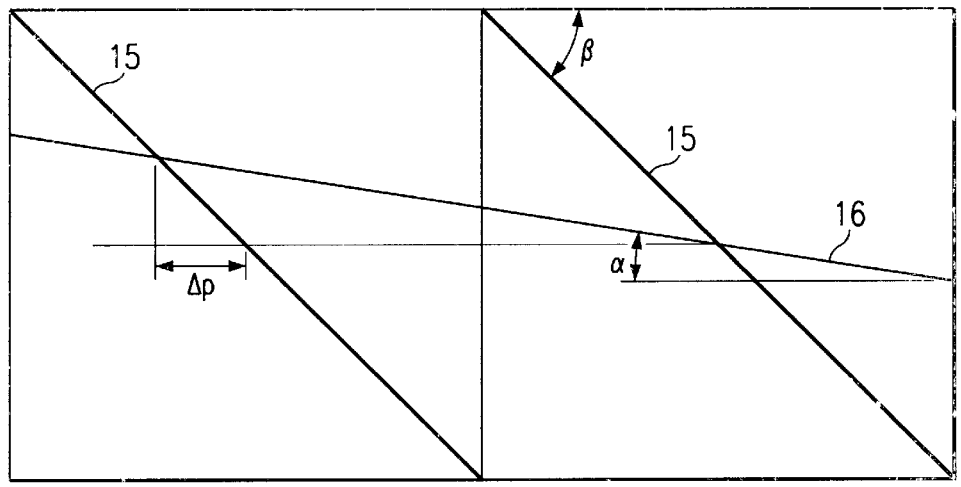
FIG. 5 illustrates the angle of mask slits and of the vertical deviation of an electron beam scan.

In order to create the light spots with a controllable periodicity, a metal mask is placed in the focal plane of the microlenses as illustrated in FIG. 5. For clarity, only two image pixels are shown in although it will be apparent that an actual display device would have several hundred or thousand pixels in each row. Each pixel is crossed by a slit (15) with an angle $\beta$ with respect to the horizontal. This slit layer is covered with a phosphor layer (not shown), which illuminates when electrons are injected.

From the discussion on the cylindrical microlenses above, we retake the argument that if we move the illumination point for each pixel over a horizontal distance $\Delta p$, we also vary the apparent source depth, and introduce, as such, a three-dimensional image. The vertical variation in illumination is not relevant, since we use cylindrical microlenses. We obtain this flexible periodicity difference ($\Delta p$) by tilting the opening slits of the microlenses with a fixed angle $\beta$, and tilting the electron beam path (16) illuminating the phosphors with an variable angle $\alpha$, as shown in $$\Delta p = L \frac{\sin \alpha \cos \beta}{\sin (\beta - \alpha)} = L \frac{1}{\tan \beta \cot \alpha - 1}$$

Equation 2 Periodicity Difference as A Function of Tilting Angles

Substituting Equation 2 for $\Delta p$ into Equation 1, the periodicity difference $\Delta p$ leads to an apparent source depth as a function of the angles $\alpha$ and $\beta$ being $$F = f_L\left(1 + \frac{\sin(\beta - \alpha)}{\sin \alpha \cos \beta}\right) = f_L \tan \beta \cot \alpha$$

Equation 3 Apparent Object Depth as a Function of the Tilting Angles.

Figure 6:
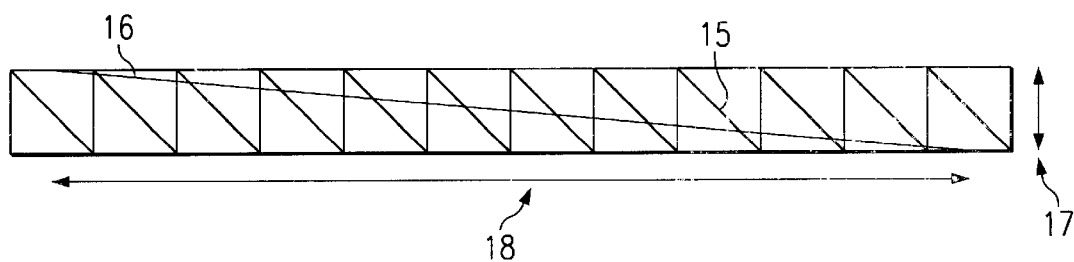
FIG. 6 illustrates the horizontal and vertical deflection of the electron beam across several pixels to create an apparent light source.

Equation 3 shows how the apparent source depth F can be varied by changing the angle α, assuming β is 45° (a typical value). Especially small angles α are useful, because they allow large changes in the image depth. FIG. 6 shows how the electron beam (16) sweeps over a large range of pixels to construct one apparent object point (i.e. for each "pixel" of the two dimensional image). This sweep is obtained by a combination of an electron beam deviation sweep in the horizontal plane over a distance Δx (18) and an electron beam deviation sweep in the vertical plane over a distance Δy (17). The deviation sweep in the vertical plane Δy corresponds with the pixel pitch L under normal circumstances. This allows one to rewrite Equation 3 as $$F = f_L \tan \beta \frac{\Delta x}{\Delta y} = \frac{f_L \tan \beta}{L} \Delta x$$

Equation 4 Apparent Object Depth as a Function of the Horizontal Deviation Sweep.

As shown, by choosing an appropriate angle for the slits in the mask and by sweeping across the vertical displacement (Δy) of one full pixel (corresponding to the pitch L of the microlens array for preferred square pixels), an apparent depth can be constructed as a function of the number of pixels that are illuminated in the x dimension.

Figure 7:
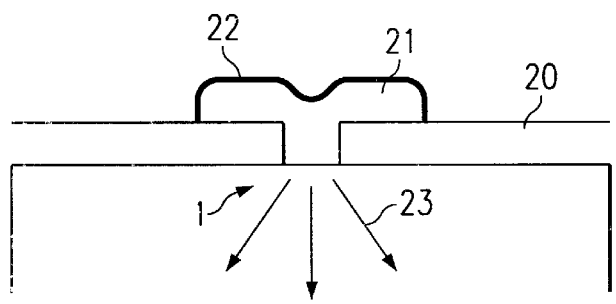
FIG. 7 illustrates a preferred embodiment mask.

2.1.2. Fabrication of the Metal Layer Containing the Tilted Slits and the Phosphor 2.1.2.1. Implementation of the Slits FIG. 7 shows a detailed cross section of slit layers. The very thin slit can be obtained using standard semiconductor processing techniques. In one preferred embodiment, a photoresist is deposited on the transparent plate (1). The wanted slit pattern is written by e-beam lithography (or conventional optical lithography) into the resist and the resist is developed. Very thin resist stripes are obtained. Next the metal layer (20) is deposited and the resist is removed, which also removes the resist on top. This technique is called lift-off. An alternative technique, which etches the metal is also possible but is not favored due to the fact that the transparent plate below the metal etched usually exhibits some damage. One skilled in the art will readily recognize other techniques for forming the thin slits fall within the scope of the inventive concept.

Next, the phosphor layer (21) is deposited. The wanted phosphor layer shape can be obtained, depending on the type of phosphor, by a lift-off or by an etching process.

Preferably, a thin aluminum backing layer (22) with a thickness in the range of about 100 nm is added on top of the phosphor layer to redirect the light. Most of the high-speed electrons of the electron beam tunnel through it.

2.1.2.2. Cross-Talk Elimination

Figure 8:
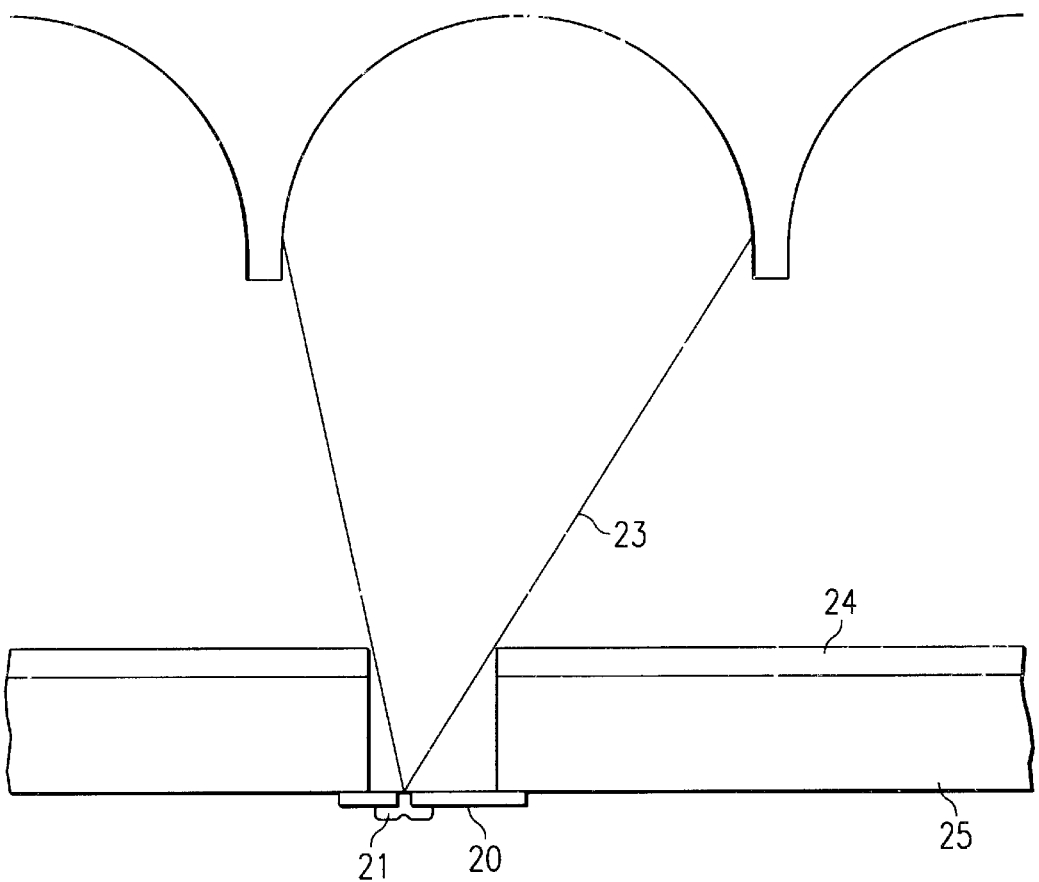
FIG. 8 illustrates a preferred embodiment mask and the effects of a blocking layer.

It is important to avoid cross talk between the different pixels, i.e. to ensure that light generated in the slit under one lens is not emitted through another lens. To prevent this, light absorbing layer (25) is formed around the light emitting slits, as shown in FIG. 8. Layer (25) collects or absorbs the light emitted under an angle that is too large. Layer (25) is preferably be formed of a material that does not reemit the absorbed light in the visible spectrum and that has an index of refraction that is larger than the glass used for the lenses. Most traditional semiconductors will do this job.

FIG. 8 illustrates the operation of layer (25). The maximum angle allowed to prevent cross talk depends on the relative positions of the slit (15) and the opening in layer (25). By changing the distance (d) between the absorbing layer and the slit, we can control this maximum angle arctan(d/H), where H is the depth of the semiconductor layer (25). We also add a very thin metal mirror (24) at the bottom of the semiconductor layer to prevent the non-absorbed light from being transmitted further.

The glass-semiconductor interface does not transmit 100%. A part of the incident wave intensity is reflected. However, due to the tilt angle β of the slit, usually 45 degrees, this light is reflected from the horizontal to the vertical direction, where it does no harm any more. Equivalently, light emitted in the vertical direction is partially redirected in the horizontal direction. Angles that are really large have multiple reflections so that the intensity is lowered substantially. A deeper etch (larger H) can even further reduce this effect at the expense of a higher loss of the wanted light.

This also influences in a similar way the maximum vertical angle of emission, i.e. arc sin(nd/√d²+H²), with n being the index of refraction of the transparent plate (1), H the depth of the semiconductor, and d the vertical distance. As has been discussed before, the screen is only intended to emit in the horizontal direction. Therefore, it can often be useful to reduce this vertical angle of emission.

2.1.2.3 Prevention of Secondary Electrons Diffusing in the Phosphorus Layer

If the excited secondary electrons have a diffusion distance larger than the slit width, one needs to foresee diffusion barriers for the secondary electrons. The simple solution is to deposit the phosphorus in stripes (26) on the slit (27) as shown in FIG. 9. Each phosphorus stripe (26) is horizontal.

2.1.2.4 Color Information

Color information is added by splitting the pixel in three parts, as shown in FIG. 10. Three different slits (28) are present in the pixel, each for one of the three colors. In FIG. 10, one slit is used for Red (R), one slit is used for green (G) and one slit is used for blue (B). The tangents of the angle α, discussed above, will be, as a consequence, divided by 3. For square pixels, this implies that β=18.4°.

When one wants to compensate for a known chromic aberration of the microlenses, one can also change the angle β of one or two of the three slits (28) or deviate slightly from the straight line as will be apparent to one skilled in the art without undue experimentation.

2.2. Liquid Crystal Display Embodiment: Pixels Split up in Stripes

Figure 20A:
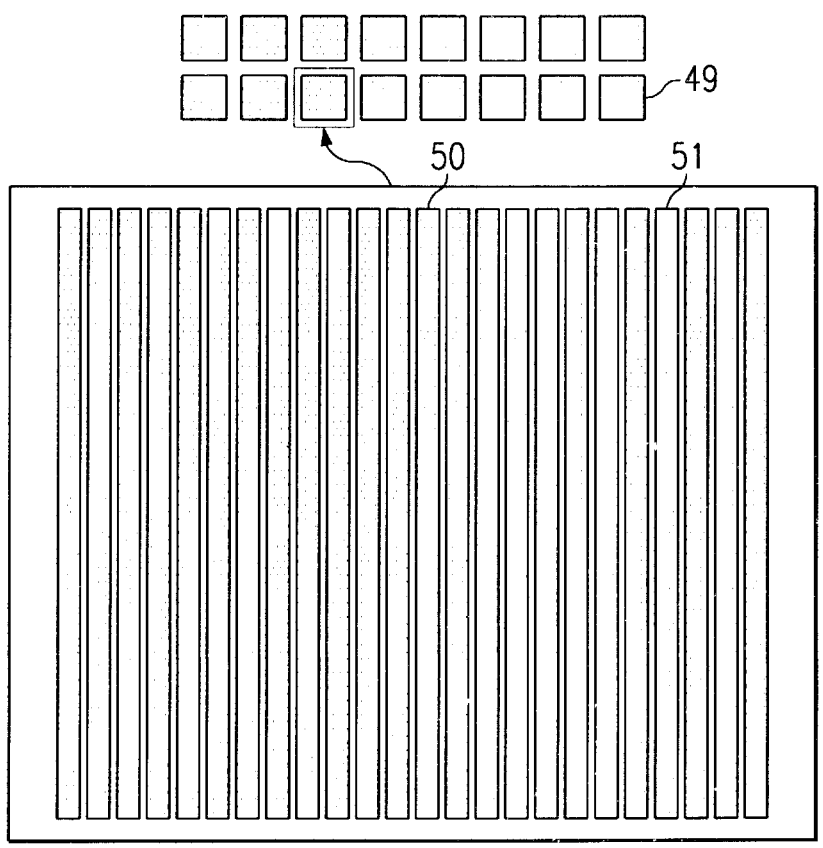
FIG. 20a illustrates a preferred embodiment Liquid Crystal Display (LCD) embodiment device.
Figure 20B:
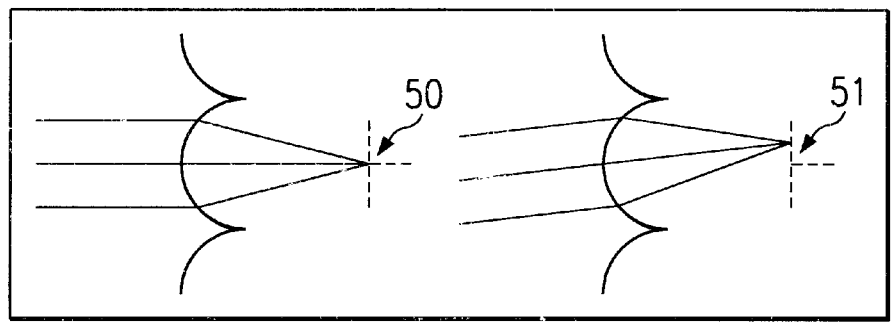
FIG. 20b illustrates the effects of illuminating a microlens at its axis and off its central axis with a preferred embodiment LCD device.

FIG. 20 shows how the emission angle, or off-axis illumination, of a pixel is controlled in the implementation of a Liquid Crystal Display embodiment. A conventional image pixel (49) is split up into vertical stripes (50, 51). Each stripe emits its light under a different angle relative to the lens in front of that pixel. The center stripe (50) will originate a light beam that goes straight and a stripe (51) at the border will originate a light beam under a significant angle with the screen. The stripes are preferably implemented at the minimal width the Liquid Crystal Display technology allows. This minimal width determines also the maximal distance an object can be constructed in front or behind the screen as will be discussed below. Due to the fact that this stripe pitch will be somewhat higher than the slit width of the Cathode Ray Tubes, we obtain a maximum object depth that is somewhat lower that the Cathode Ray Tube system. However, current Liquid Crystal Display technology allows for construction of a complete screen with Liquid Crystal pixels as small as 10 μm×10 μm (see Publ. Ref. 8). Stripes can be constructed as a consequence with a pitch being smaller or at least equal to this 10 μm. This implies that more than 30 stripes can be implemented in a traditional screen pixel of 300 μm×300 μm.

Figure 21:
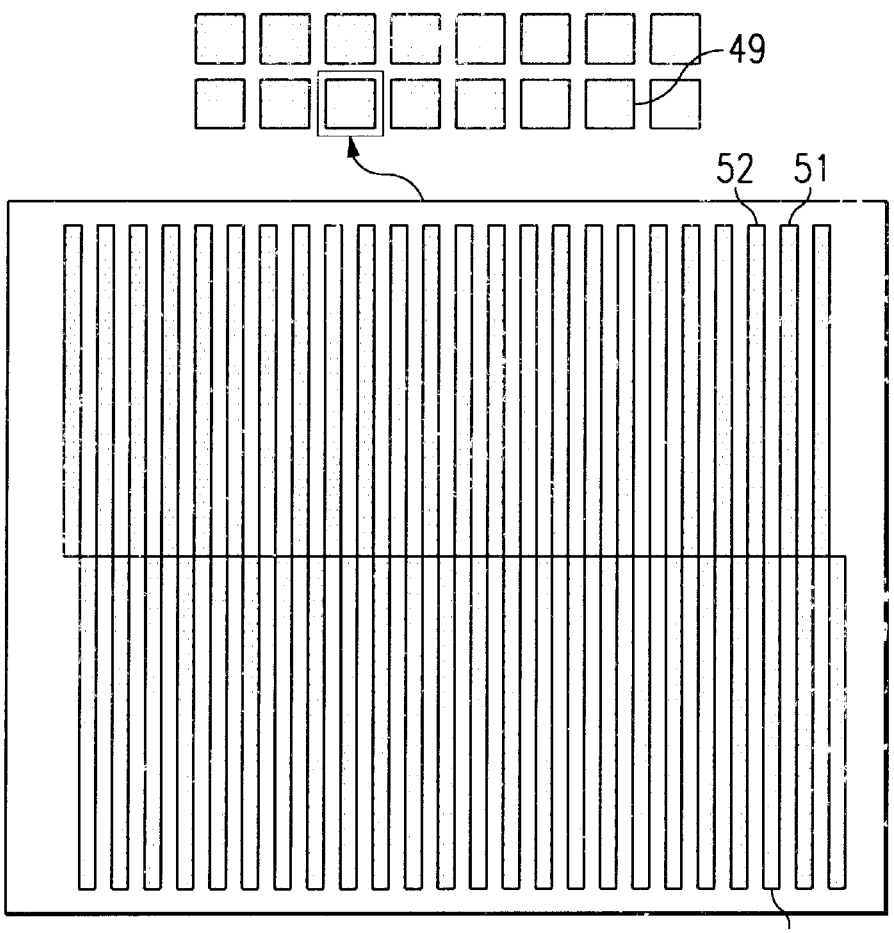
FIG. 21 illustrates an LCD embodiment device having interlacing LCD stripes.

Also shown in FIG. 20 are so-called black angles (i.e. non-illuminated areas) corresponding to the unused area between the stripes. These black angles can be avoided by interlacing the stripes, as is shown in FIG. 21. Stripe (53) covers the black angle that would appear between stripes (52) and (51). In this layout, more than 60 stripes can be implemented in a traditional screen pixel of 300 μm×300 μm. The overall 3D-image luminescence is somewhere between half and a quarter of the 2D-image luminescence, due to the unused area between the stripes.

3. The Combination of a Set of Microlenses Each at a Specified Emission Angle 3.1 Cathode Ray Tube embodiment: Electron beam deviation In this section we discuss the control signals that need to be generated in order to obtain the wanted electron beam deviation (i.e. to cause the off-axis illumination necessary to create the difference in periodicity Δp). These signals (if present) will be superimposed on the traditional electron beam signals used to generate a conventional two-dimensional image. When no depth signals are present, a flat image will be obtained.

3.1.1 Normal Electron Beam Deviation

As is well known in the art, a conventional interleaved CRT system scans across every other row (e.g. the odd numbered rows) of a picture frame from left to right, proceeding from the top of the display screen to the bottom. The beam then scans the alternate rows (the even numbered rows) from left to right, proceeding from the top of the display to the bottom. In this way, the beam scans across each row once for every picture frame.

By contrast, the preferred CRT embodiment of the present invention requires multiple scans of the electron beam for each row for the following reasons. Recall from the discussion of FIG. 6 and Equation 4 above, that apparent depth can be imposed on an object point by sweeping the electron beam over a distance Δx. This distance Δx corresponds to multiple pixels, as illustrated in FIG. 6. Therefore, for each pixel in a row, the electron beam will need to sweep across some number of pixels (corresponding to the distance Δx necessary to create the desired depth perception for that point). For this reason, the electron beam will scan across each row not once, but N times, where N is the number of pixels in the row.

In actual operation, the electron beam need not scan across the entire row, however, but need only sweep across the number of pixels corresponding to the horizontal displacement (Δx) necessary for the desired depth perception.

Note also, as shown in FIG. 6, that the electron beam will be deflected vertically as well as horizontally during each sweep across the row. This is done in order to create the off-axis illumination point. In other words, by varying the beam vertically, we vary where the beam will intersect the angled slit (15) and hence we vary the apparent source of the illumination vis-à-vis the axis of the lens.

The deviation under normal circumstances in the vertical direction will go from the bottom of the pixel row to the top of the pixel row, maintain some time here (to allow the horizontal deviation to go to the next pixel) and subsequently it will go from the top of the pixel back to the bottom of the pixel, hold some time here and the process will restart. Under normal circumstances we have that $y_{max}=L/2$ and $y_{min}=-L/2$, namely half of the pixels' pitch. This is shown in FIG. 11b.

Figure 11B:
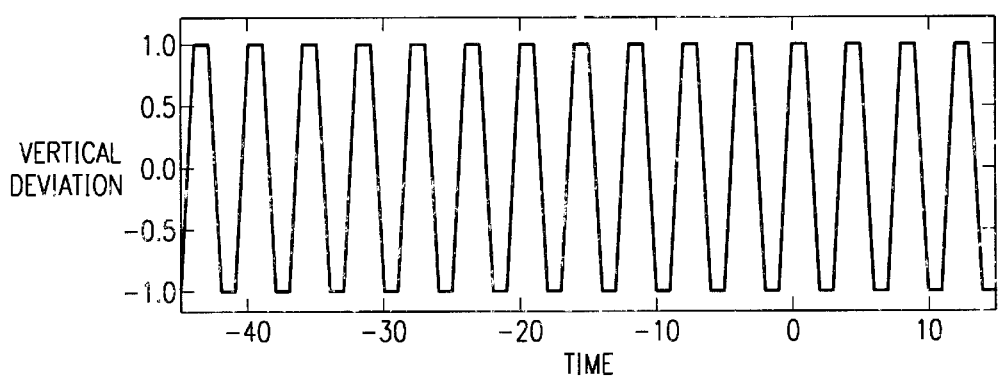

FIG. 11a shows the normal deviation in the horizontal direction for an object line going from in front of the screen to behind the screen. It contains sweeps over pixels in the horizontal direction that correspond to sweeps in the vertical direction shown in FIG. 11b. These sweeps generate together one object point. Next, it also contains sweeps at a fixed slope that allow going to the next pixel. These sweeps correspond to constant vertical deviation. Please note that points in front of the screen have an opposite deviation sweep compared to points behind the screen.

Figure 12:
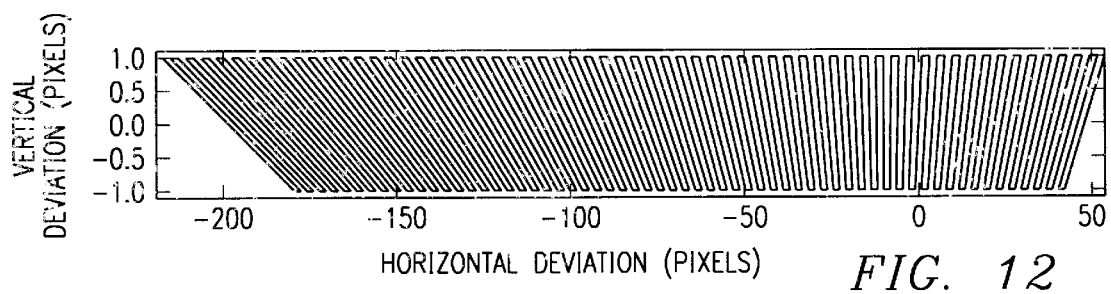
FIG. 12 graphically illustrates both the horizontal and vertical deviation of the scanning electron beam.

FIG. 12 shows the corresponding trace of the electron beam over the horizontal array of pixels. Please note the scale difference between both axes. Both vertical and horizontal deviation signals can be modulated in order to compensate for possible chromic and cylindrical aberrations in the microlenses, if any. This can be part of a calibration procedure after construction.

As will be apparent to one skilled in the art, the above described embodiment requires that the electron beam deflection circuitry operate to deflect the beam (at least in the horizontal deviations) at speeds considerably higher than in conventional systems. This is practical with current state of the art circuits and processes, however. As an example, with a screen refresh rate of 60 Hz and a screen resolution of 1000 times 600 pixels, the electron beam deviation needs to be modulated at a frequency of 18 MHz. (There is one sweep every two pixels). Traditional analogue oscilloscopes are able to modulate a beam deviation up to a frequency of 500 MHz. Obviously, then, the 18 MHz frequency required for operation of the preferred embodiment system is readily obtainable. The calibration of the modulation and the focusing is important though. One should foresee on the metal areas of the screen several electron collection points that allow this calibration.

3.1.2 Space Angle Aspects

Figure 13:
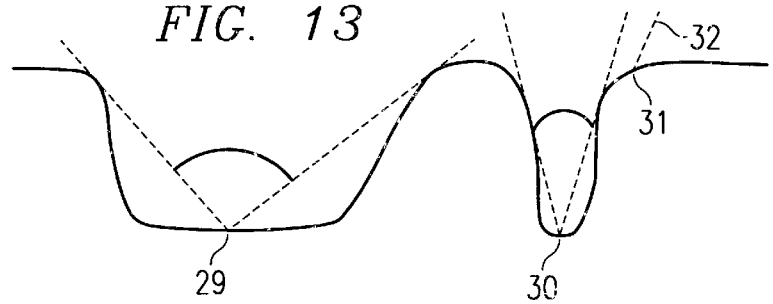
FIG. 13 illustrates objects at the same depth having different space angles.

An important feature of reconstructing a 3D image is the space angle under which each emitted image point is visible. Each image point has to be defined with its depth and space angle. FIG. 13 illustrates this. Point (30) is located at the same depth as point (29), but point (29) emits light under a substantial larger space angle. If point (30) would emit light under the same space angle, it would hide information coming from point (31) for observation.

Figure 14:
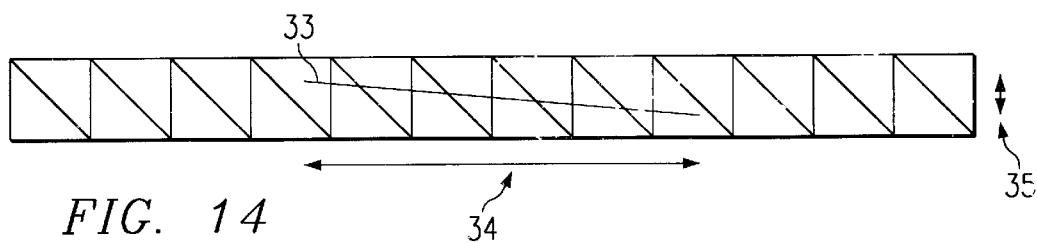
FIG. 14 illustrates a limited horizontal and vertical deviation for an object with a limited space angle.

The above implies that the space angle needs to be limited in some cases. A normal modulation on the electron beam covers vertically one full pixel, such that light is emitted in all possible directions. When the space angle needs to be restricted, as is the case for point (30), both the horizontal (34) and the vertical (35) electron beam sweeps need to be limited, as is shown in FIG. 14.

The space angle can be calculated from the depth variation information and does not need to be transmitted as a consequence. It is possible to operate this three-dimensional screen technology without a system to limit the opening angle. This will impose limits on the maximal depth variations present in the image, however.

3.2. Liquid Crystal Display Embodiment: Selecting the Correct Pass-transistor(s)

Figure 22A:
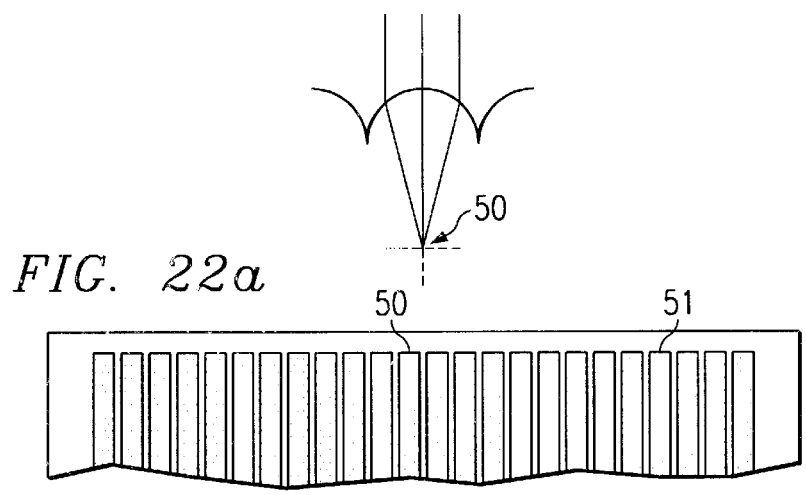
FIGS. 22a through 22c illustrate construction of an apparent light source at and in front of, respectively, the screen with a preferred embodiment LCD device.
Figure 22B:
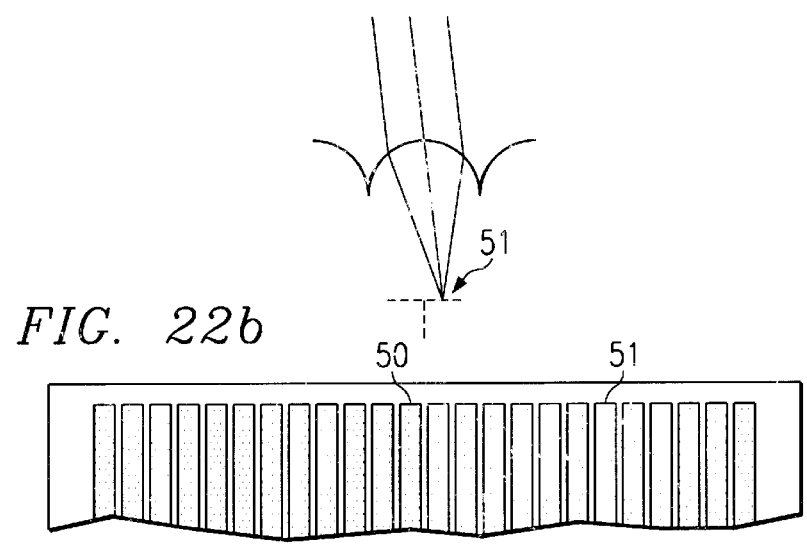
Figure 22C:
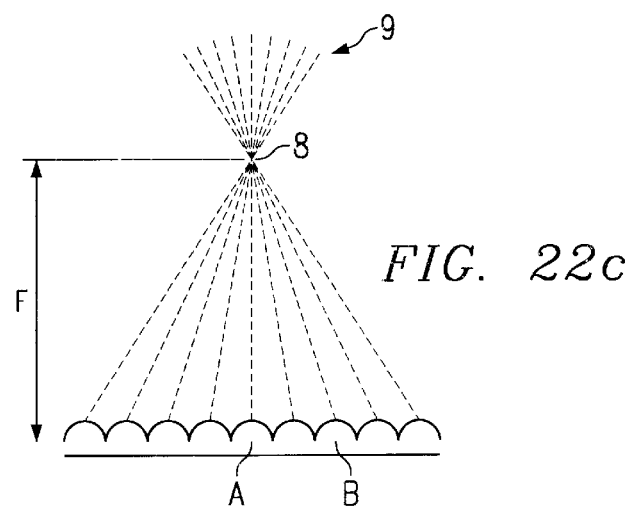

As already has been discussed above, one needs (in order to construct a point (8) or (7) in front or behind the screen, respectively) to control the light emission from a whole set of microlenses, all on the same horizontal line, all with the same signal intensity, but all at a different angle (see FIGS. 22a through c). As a consequence, it is preferable to use a horizontal pixel driver line with the signal intensity and select signals and to use pass transistors to select which stripe should be driven. It is impractical to hardwire all the pass transistors of all different stripes of a complete line to individual drivers. Rather, the selection data for the pass transistors are preferably placed in a shift register, which will also be shifted along the horizontal line. When the center stripe (50) of the microlens needs to be illuminated, a '1' will be present in the corresponding bit of the shift register. A '0' is present in all other registers. On the other hand, when an outer stripe (51) needs to be selected, a '1' will be present in the corresponding bit of the shift register. The other registers are here also all '0'.

Figure 23:
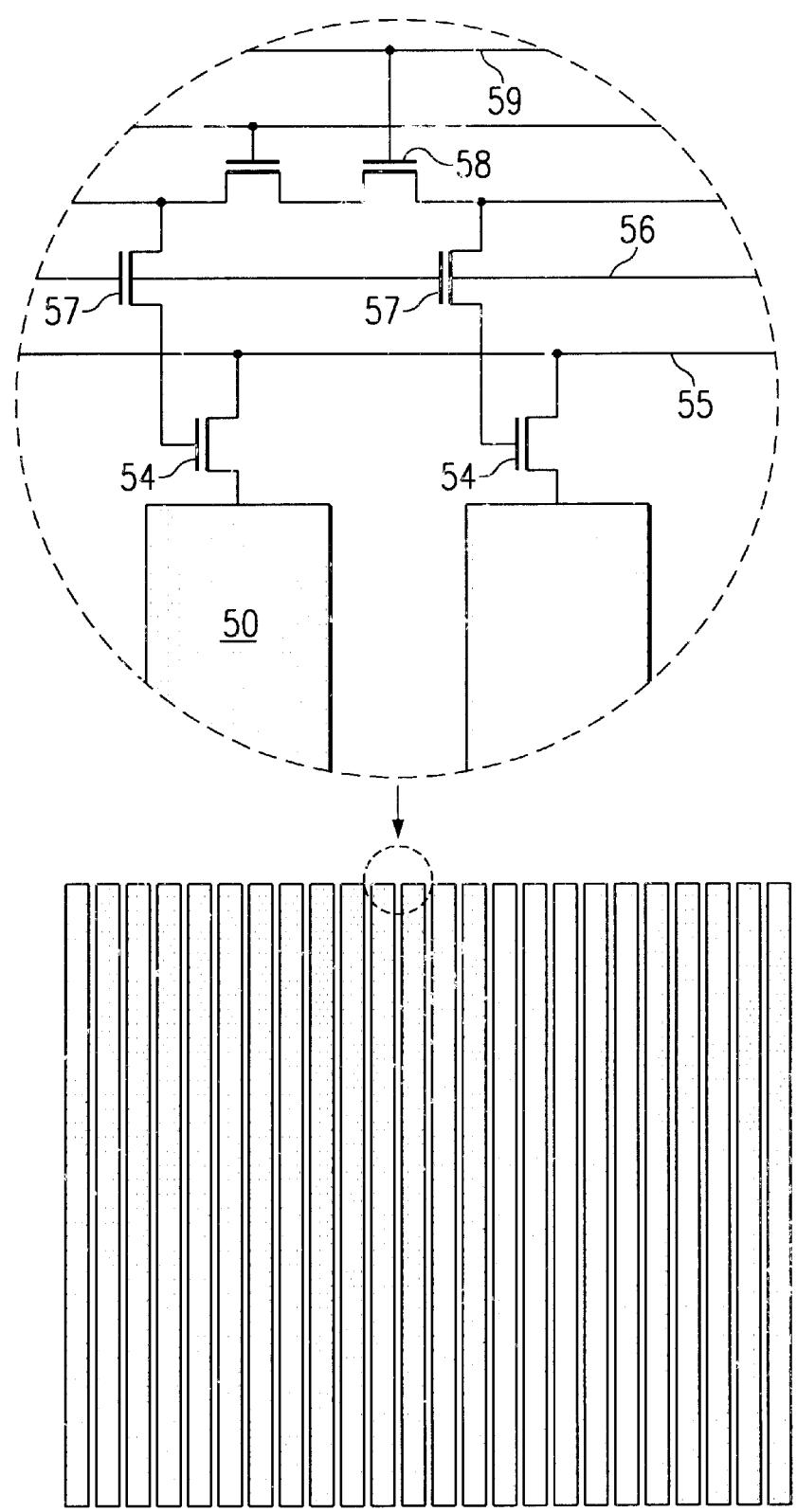
FIG. 23 schematically illustrates the driving circuitry for a preferred LCD embodiment device.

FIG. 23 shows a possible implementation of this shift register as a double clocked CCD array. The CCD gates (58) are controlled by the two clock lines (59). When the array of '0's and '1's is at the required position, the information is transferred to the gates of the pass transistors (54) by the transfer transistors (57). The transfer line (56) controls the transfer transistors (57). Finally, the signal on the signal line (55) is transferred to the stripes (50) by the pass transistors (54). This implementation is the most evident implementation but not the most appropriate for the following reasons: Current Thin Film Transistor technology does not reproduceably yield transistors of sufficient quality to fabricate a double clocked CCD array as illustrated. Additionally, after the status of the shift register is transferred by the transfer transistor (57), its content is lost, so that it can't be shifted further any more, and a new shift register content needs to be shifted in from the side. Usually neighboring pixels don't have depths that are substantially different, so that it is in most cases sufficient to shift the content of the shift register to the next pixel.

Figure 24A:
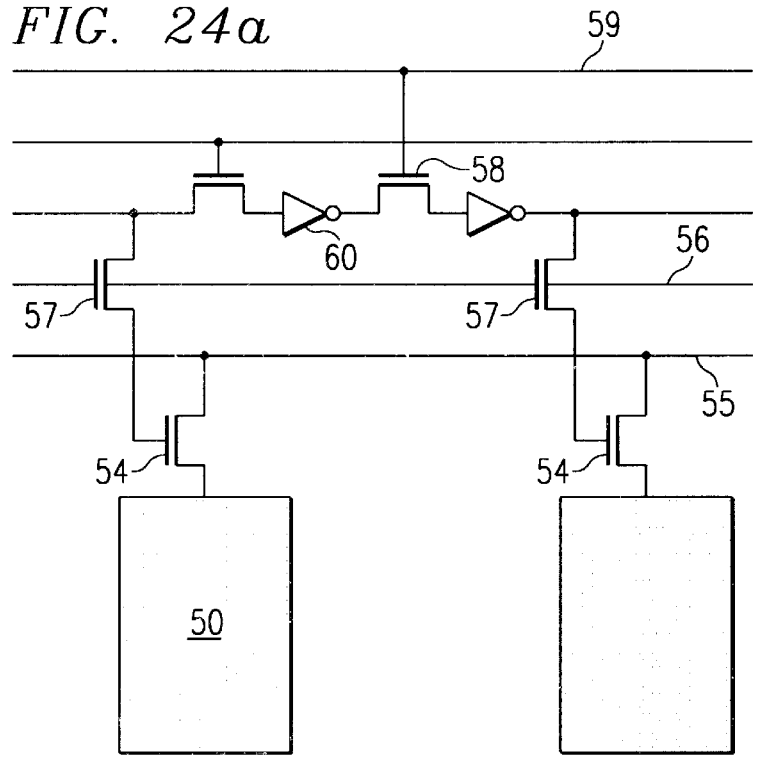
FIGS. 24a and 24b illustrate preferred embodiment driving circuits.
Figure 24B:
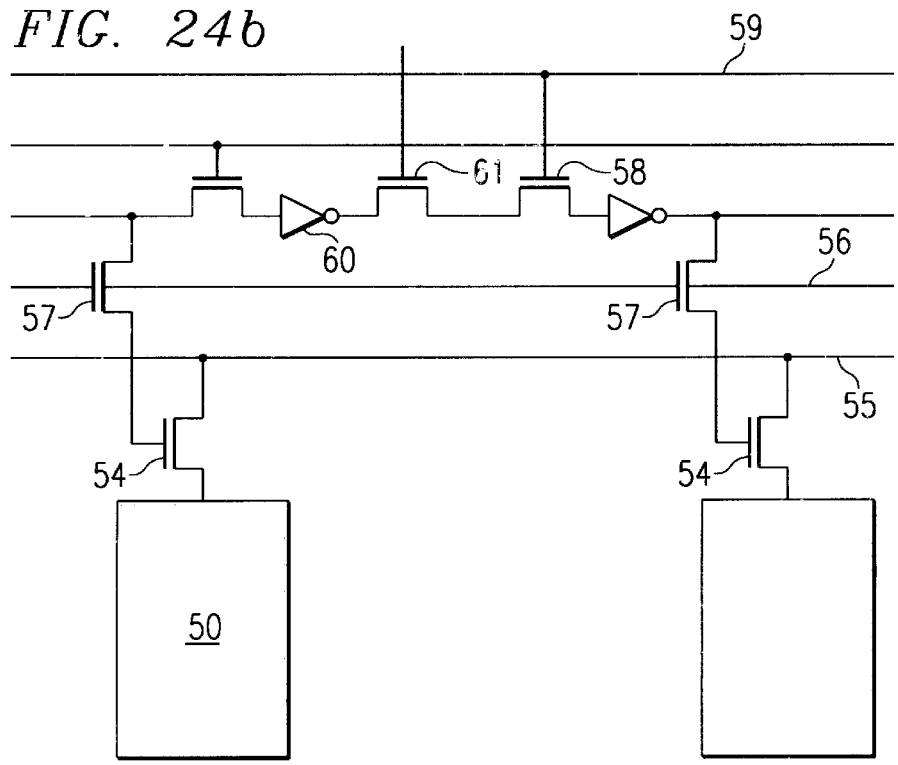

FIG. 24a shows an improved system where the bits are restored power level values when they shift along the horizontal axes. This is done by the inverters (60). This system indeed allows shifting the present series of '1' to the next pixel if the depth of the next pixel is equal. The system can also be improved to cope with the case that the next pixel has a slightly different depth. This is done by additional control gates (61) that allow making the series longer or shorter, as illustrated in FIG. 24b.

4. The Control That Each Object Point is Visible Under All Required Angles 4.1. Cathode Ray Tube Embodiment: Electron Beam Focusing The preferred CRT embodiment also the focusing of the electron beam with the required depth of the apparent light source. As each point in the image can have a different depth, the focusing system is controlled with variations at megahertz frequency. The following section describes a method for adjusting the electron beam focus as a function of the apparent depth of the image.

4.1.1. Infinite Distance

Figure 15:
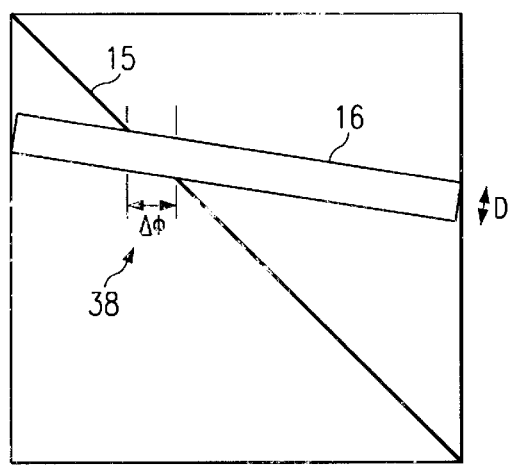
FIG. 15 illustrates the width of the electron beam.
Figure 16:
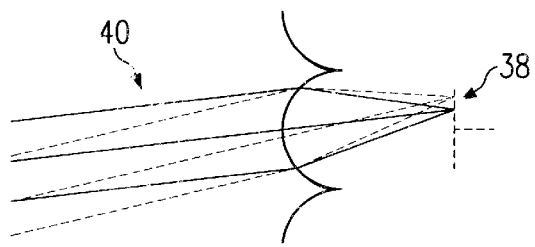
FIG. 16 illustrates the light beam divergence arising from the finite width of the electron beam.

All light coming from an object at an infinite distance should propagate perfectly parallel. This implies that the origin of this light should be a single point in the focal plane of the microlens, as show in in FIG. 4. Due to the fact that the slit (15) has a finite width and moreover, due to the fact that the electron beam can not be focused perfectly, the origin of the light in the focal plane will not be a single spot, but will be spread out over some distance. FIG. 15 shows that an electron beam (16) with a width D covers a horizontal distance Δφ(38) when it crosses the slit (15). This horizontal distance Δφ(38) results in a light beam, which diverges slightly. This is shown in FIG. 16, which is a "top down" view of the pixel illustrated in FIG. 15. The horizontal distance (38) leads to a beam divergence (40). As a consequence, the system is unable to reconstruct images at an apparent infinite distance behind the screen 4.1.2. Finite Distance Behind the Screen When the apparent object (7) is at a finite distance behind the surface, a light beam should be generated with a divergence (40). See FIGS. 3 and 16 as examples. This requires a certain electron beam spot diameter (38). For a typical system with a microlens pitch of 300 micron, an apparent image at 20 cm behind the screen requires an electron beam spot diameter of 1 micron. An apparent image at 10 cm behind the screen requires an electron beam spot diameter of 2 micron. An apparent image at 1 cm behind the screen requires an electron beam spot diameter of 20 micron. An apparent image on the screen requires a spot diameter corresponding to the pixel size. Equation 5 gives the relation between the apparent object distance (F) and the electron beam width. This allows concluding that the apparent depth that can be generated depends on the focusing capabilities of the electron beam system. Defocusing is usually not the problem. For a typical television system, an apparent depth of 20 cm behind the screen can be obtained, which is for human perception, already be close to the infinite distance. A larger display system can obtain much larger apparent depths.

$$D = L \sqrt{\frac{1}{1 + \frac{\cot^2\beta}{f_L^2}F^2}}$$

Equation 5 Relation Between Beam Width D and the Apparent Object Distance F for an Image Behind the Screen.

4.1.3. Finite Distance in Front of the Screen

Figure 17:
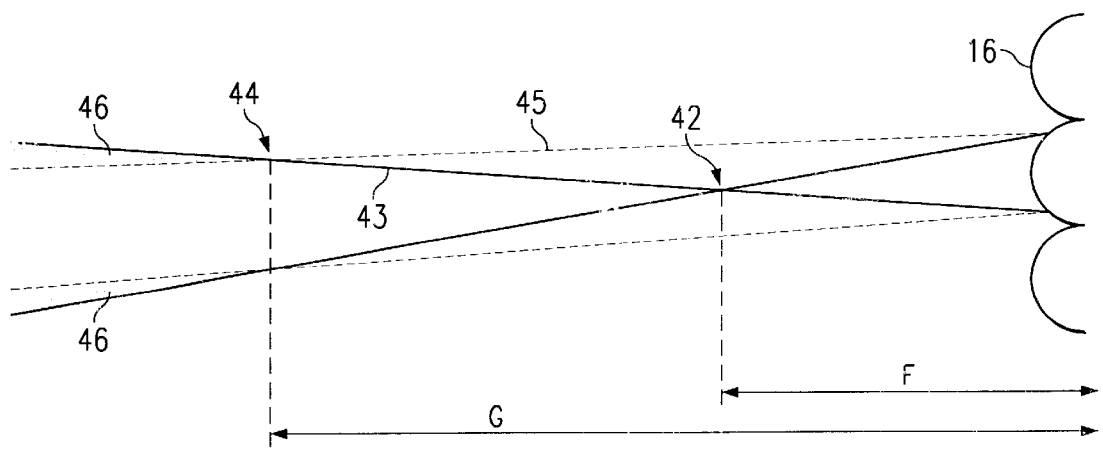
FIG. 17 provides a light beam profile for an apparent object in front of the screen.

Images with an apparent object (8), (42) in front of the screen should have a light profile that first converges and than diverges, as illustrated in FIGS. 3 and 17, respectively. This light profile (43) can not be reproduced from light sources in the focal plane of the microlenses (16), but can be approached by an equivalent light profile (45), as shown in FIG. 17. Therefore, one has to make an educated guess of the closest possible distance (44) of the observer. This minimal distance is labeled G. In theory, the observer should always be at a distance of at least twice the distance of the apparent image. In reality, this distance should be even larger due to the minimal divergence of the light beam. Once the minimal observer distance (G) is fixed, the needed light beam divergence (45) can be calculated, and from this, the needed electron beam focus D. Equation 6 shows this relation for images in front of the screen.

$$D = L\frac{G - 2F}{G} \sqrt{\frac{1}{1 + \frac{\cot^2\beta}{f_L^2}F^2}}$$

Equation 6 Relation Between Beam Width D and the Apparent Object Distance F for an Image In Front of the Screen.

When $D_{min}$ corresponds to the minimal beam width of the system, Equation 5 and Equation 6 allow determining the apparent object depth range.

Figure 18:
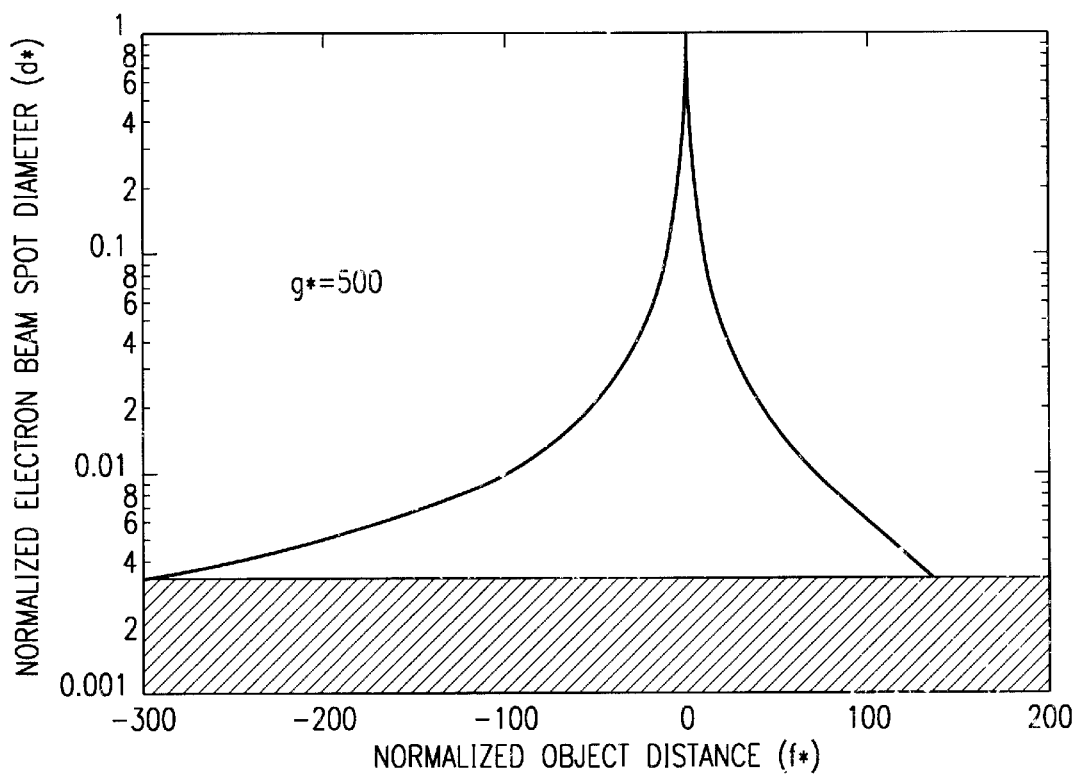
FIG. 18 graphically illustrates the normalized electron beam width as a function of the normalized object distance.

FIG. 18 shows the normalized electron beam width $d^*=D/L$ versus the normalized object distance $f^*=F \cot(\beta)/f_L$ with the normalized observer distance $g^*=G \cot(\beta)/f_L$. Both objects in front of the screen (Equation 6) and objects behind the screen (Equation 5) are taken into this figure. One observes the object distances where the electron beam focusing becomes problematic.

One observes in FIG. 17 that, due to the incorrect approximation of the light beam profile, a so-called black angle 46 is created. This black angle 46 starts to give a black point in the observer's perception as soon as the cross section becomes larger than the human eye's pupil. The human eye pupil is under normal conditions about three millimeters. Considering a pixel pitch of 300 micron, one can conclude that the maximal observers distance is about 10 times the minimal observers distance before the effects of black angle 46 become perceptible.

It bears noting that the light source is preferably fixed in the focal plane of the microlenses, in contrast with traditional integral photography, in which the light source is placed at the average distance of the object's image made by the microlens. This principle cannot be employed in the preferred embodiments, due to the imperfect focusing of the electron beam. But, as discussed above, the imperfect focusing of the beam allows for creation of the divergence needed for the desired depth perception.

4.1.4. Preventing Interaction With Pixels From a Different Row

Figure 19A:
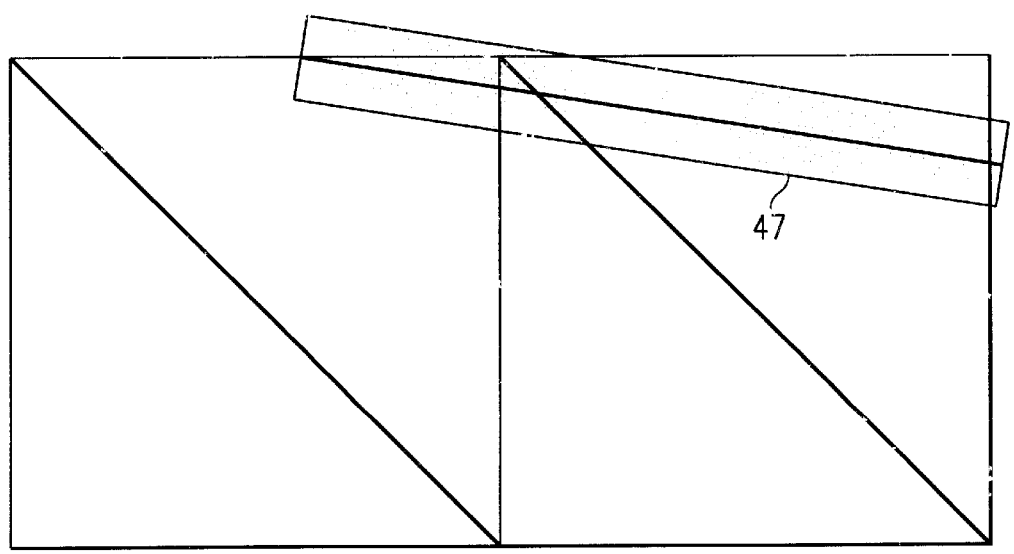
FIGS. 19a and 19b illustrate the use of electron beam narrowing to prevent interference between adjacent rows of pixels.
Figure 19B:
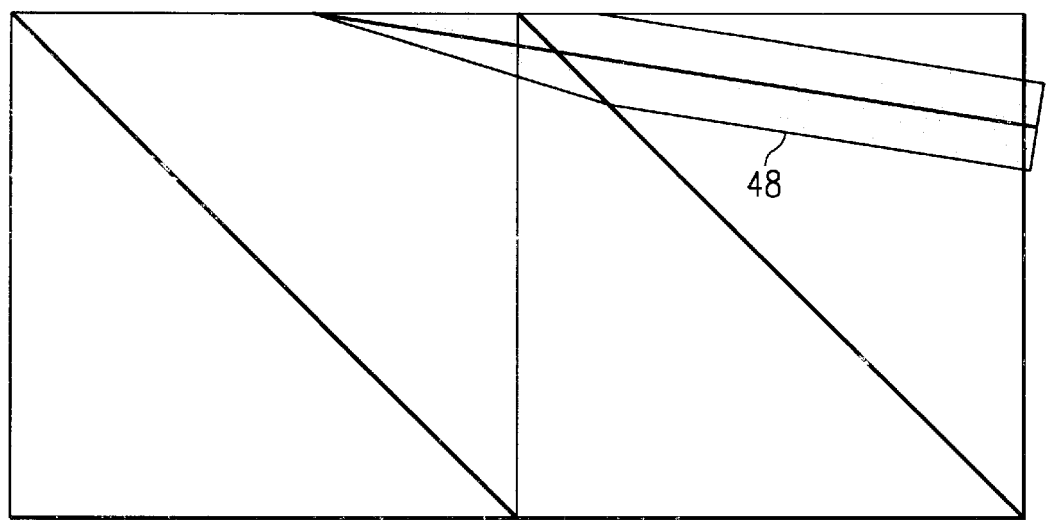

When an electron beam has a certain width and the subsequent rows are placed close to each other (in the vertical direction), the electron beam may undesirably illuminate neighboring rows. This phenomenon is illustrated in FIGS. 19a. To eliminate this, for each vertical position an electron beam width is chosen which is the minimum of: double the distance to the pixel border line; or the calculated beam width as provided for in Equation 5 or Equation 6. FIG. 19b illustrates the effect of selecting the beam width in this manner. Other algorithms that can be used to avoid interaction between neighboring rows will be known to one skilled in the art and can readily be incorporate into the described preferred embodiments without undue experimentation.

4.2. Liquid Crystal Display Embodiment: Series of '1's

Figure 25:
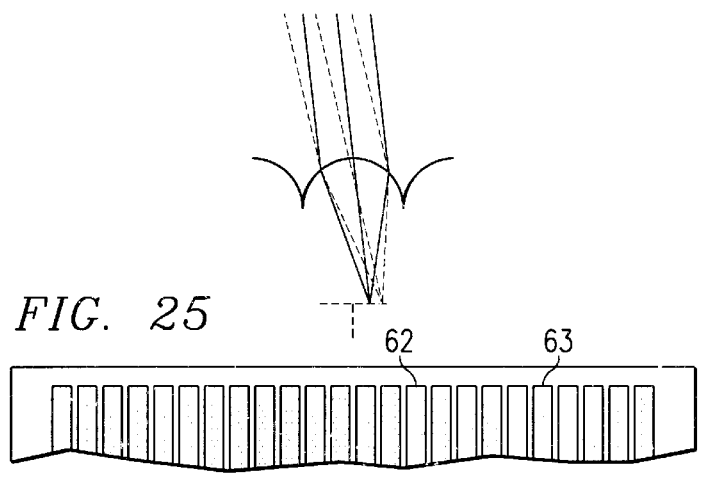
FIG. 25 illustrates light beam divergence arising from multiple illuminated LCD stripes.

The visibility of the object needs, also in the Liquid Crystal Display embodiment, to be guaranteed under all angles, in a similar way as in the Cathode Ray Tube embodiment. In the Liquid Crystal Display embodiment this is obtained by a series of '1's, as is shown in FIG. 25 (the series of '1's goes from stripe (62) to stripe (63)). For an image behind the screen the number of '1's in the series (i.e. a series of illuminated stripes) can be taken equal to the Δp, expressed in units of stripe width. In the case of an image behind the screen, this number needs to be corrected with the factor (G-2F)/G, as discussed above.

Figure 26:
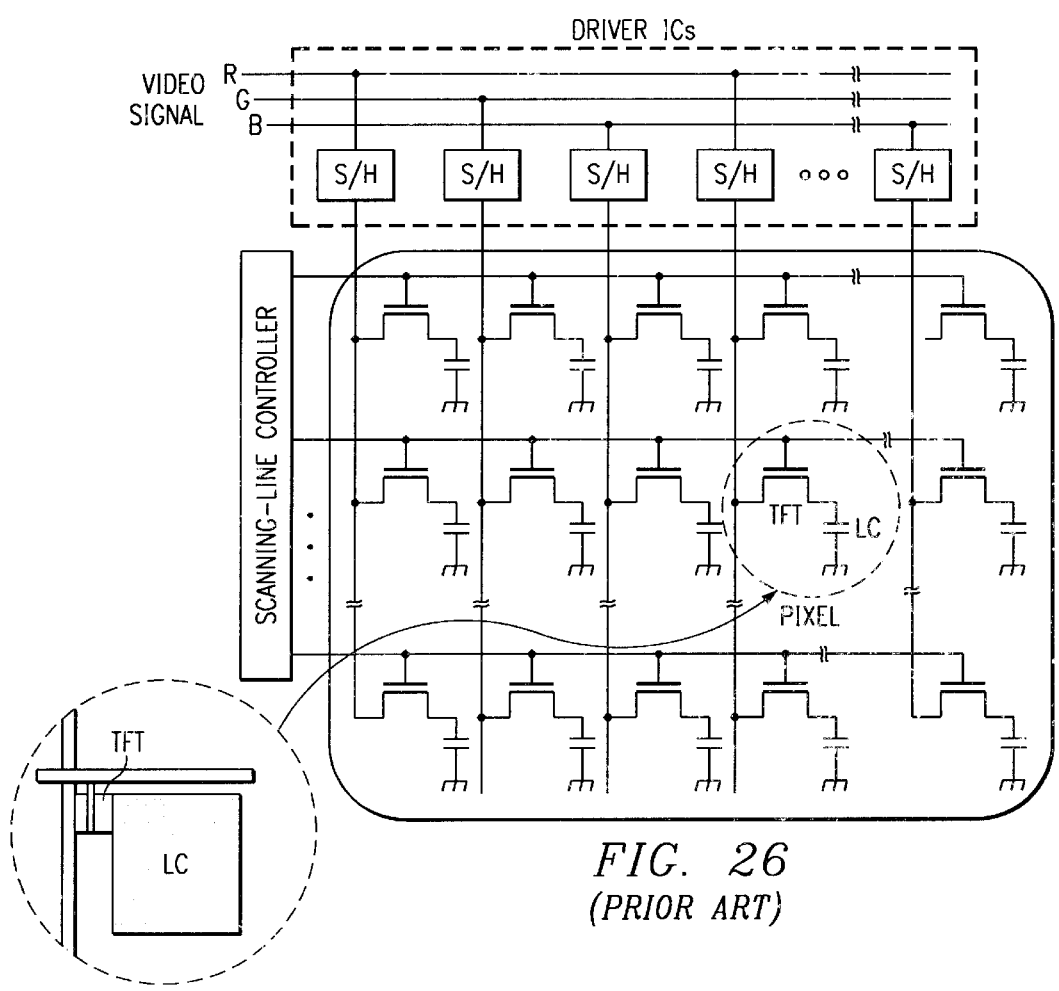
FIG. 26 illustrates a prior art LCD driving circuit.

Further detail of the preferred Liquid Crystal Display embodiment is illustrated in FIG. 26 (which illustrates a prior art LCD display) and FIG. 27, which illustrates certain features of the preferred embodiment LCD 3-D display. The signal line drivers (71) are placed on IC's (65) along the side of the display (64), rather than on top as is the case in a conventional display. Moreover, the pass transistors are controlled by a shift registers (66) which gets its input (69) and its control (68) from the IC (65).

5. Video Broadcasting Technologies

The depth information is the only additional information that needs to be transmitted. For each pixel one depth value is added.

For the preferred Cathode Ray Tube embodiment the following steps are undertaken from the depth signal:

The space angle for each point is calculated from the evolution of the depth value (F).

$y_{max}$ and $y_{min}$ are calculated from the space angle.

$x_{max}$ and $x_{min}$ are calculated from $y_{max}$ and $y_{min}$ using Equation 7

$$F = f_L \tan \beta \frac{x_{max}}{y_{max}} = f_L \tan \beta \frac{x_{min}}{y_{min}}$$

Equation 7 Apparent Object Depth as a Function of the Ratio Between Horizontal Deviation Sweep and Vertical Sweep.

The beam diameter is calculated using Equation 5 or Equation 6, depending on whether the point is in front of or behind the screen.

If the electron beam crosses pixel of a different row due to the spot diameter, the vertical sweep and the spot diameter is modified, according to what is described under section 4.1.4.

The beam intensity is calculated from the two-dimensional beam intensity and the horizontal scan length (a slower scan speed results in more electrons per pixel).

For the preferred Liquid Crystal Display embodiment the following steps are undertaken from the depth signal:

The Δp for each point is calculated (in units vertical stripe pitch) from the depth value (F) using Equation 1.

The space angle is restricted in case the point could be hidden behind other points under certain angles.

The number of subsequent '1' bits for each pixel is taken equal to the Δp for an image behind the screen and (G-2F)/G Δp for an image in front of the screen.

The array of '0' and '1' bits is shifted into the shift register or an array present in the shift register is moved to the required location.

The content of the shift register is passed to the pass transistors

The pixel intensity signal is applied.

The pixel depth information does not need the same resolution as the luminescence and the color. Usually depth information evolves much smoother as color or intensity. This implies that the bandwidth needed to transmit the depth information is limited. A first option is to add this signal in a similar way as R-Y and B-Y signals are to the television signal, by using a higher carrier frequency.

One can also consider transmitting these data MPEG encoded in the off-screen area of the television image, which is usually used to transmit information. In this case, very fast varying depths will have a lower depth resolution, but still images have a very high depth resolution.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

I claim:

1. A display device for generating a three-dimensional image from an image signal, the image signal including depth information, comprising:

an array of microlenses having a first pitch in a first direction; and an array of light sources impinging upon the microlens array and having a second pitch in the first direction, the second pitch being variable, the array of light sources comprising:

an array of phosphor elements;

an electron beam directed to impinge upon individual phosphor elements and to cause the individual phosphor elements to emit light; and a mask intermediate each phosphor element and the microlens array, the mask having an angled slit therein to allow a portion of the light emitted by the phosphor elements to pass therethrough; and wherein the second pitch of the array of light sources varies in response to the depth information of the image signal and is determined from a combination of the location of the electron beam impinging upon the phosphor elements and the angle of the slit.

2. The display device of claim 1 further comprising:
an electron beam deflector; wherein the depth information of the image signal controls the deflection of the electron beam.

3. The display device of claim 2 wherein the electron beam scans across a horizontal row of phosphor elements and wherein the control signal is superimposed upon the horizontal scan.

4. The display device of claim 1 wherein the number of light sources impinging upon the microlens array for a given object in the three dimensional image is proportionate to the apparent depth of the given object in the image.

5. The display device of claim 1 wherein the array of microlenses is comprised of cylindrical microlenses.

6. The display device of claim 1 wherein the first pitch is 300 microns.

7. A display device for generating a three-dimensional image from an image signal, the image signal including depth information, comprising:
an array of microlenses having a first pitch in a first direction; and
an array of light sources impinging upon the microlens array and having a second pitch in the first direction, the second pitch being variable, the array of light sources being comprised of rows of liquid crystal display elements, each row further comprising:
a horizontal line driver;
a plurality of pass transistors connecting each liquid crystal display element with the horizontal line drivers;
a shift register, coupled to the horizontal line driver;
a plurality of transfer transistors each comprising a gate and each coupled to the plurality of pass transistors and to the shift registers; and
a transfer line connected to the gate of each of the transfer transistors wherein the second pitch of the array of light sources varies in response to the depth information of the image signal.

8. The display device of claim 7 wherein the shift register comprises a charge coupled device array.

9. The display device of claim 7 wherein the shift register comprises a series of inverters and pass transistors.

10. A display device capable of generating a three-dimensional image from an image signal, the image signal including depth information, the device comprising:
a display plate having an array of microlenses thereon, each microlens of the array having a central axis, each microlens having a substantially constant focal length along its central axis;
wherein each microlens of the microlens array has a plurality of illumination locations relative to the central axis of the microlens;
a selection circuit receiving as input depth information corresponding to a given microlens and outputting a selection signal corresponding a desired illumination location for the given microlens; and
an illumination circuit receiving as input the selection signal and causing in response illumination of the desired illumination location.

11. The display device of claim 10 wherein the illumination circuit further comprises an array of illumination sources, each illumination source being capable of illuminating a corresponding microlens at the plurality of illumination locations.

12. The display device of claim 11 wherein said illumination sources comprise a plurality of liquid crystal display elements, at least one liquid crystal element being provided for each of the plurality of illumination locations.

13. The display device of claim 10 wherein said illumination circuit further comprises:
an electron beam generator;
an electron beam deflector;
an electron beam controller; and
wherein the electron beam controller causes the electron beam deflector to deflect an electron beam generated by the electron beam generator to impinge upon a phosphor element at locations of the phosphor element corresponding to the plurality of illumination locations.

14. A display device capable of generating a three-dimensional image from an image signal, the image signal including depth information, the device comprising:
a display plate having an array of microlenses thereon, each microlens of the array having a central axis;
wherein each microlens of the microlens array has a plurality of illumination locations relative to the central axis of the microlens;
a selection circuit receiving as input depth information corresponding to a given microlens and outputting a selection signal corresponding a desired illumination location for the given microlens;
an illumination circuit receiving as input the selection signal and causing in response illumination of the desired illumination location; and
a mask intermediate each phosphor element and the microlens array, the mask including a slit through which illumination from the phosphor element can impinge upon the plurality of illumination locations.

15. The display device of claim 14 wherein the phosphor elements are divided into horizontal stripes.

16. A method of generating a three-dimensional image comprising:
receiving an image signal, the image signal including depth information for each pixel of the image;
converting the depth information into a periodicity difference, the periodicity difference being the difference between the fixed pitch of a microlens array and the variable pitch of a series of light sources illuminating the microlens array necessary to create an image for the pixel corresponding to the depth information;
illuminating the microlens array with the series of light sources at the variable pitch required to achieve the desired periodicity difference.

17. The method of claim 16 wherein the depth information is converted into a periodicity difference by calculating the vertical and horizontal deviation of a scanning electron beam necessary to achieve the desired periodicity difference.

18. The method of claim 16 wherein the depth information is converted into a periodicity difference by selecting certain display elements of an array of display elements, the selected display elements being spaced apart at the variable pitch.

19. A device for displaying a moving three dimensional image from a signal including depth information, the device comprising:

a microlens having a central axis and having a substantially constant focal length along the central axis;

a light source adjacent the microlens and positioned to illuminate the microlens at an illumination spot;

means for adjusting the location of the illumination spot relative the central axis of the microlens, said means being responsive to said depth information contained within said signal.

20. The device of claim 19 wherein the light source comprises:

a electroluminescent material;

a scanning electron beam impinging the electroluminescent material.

21. The device of claim 19 wherein the light source comprises a plurality of liquid crystal elements.

22. The device of claim 19 wherein the wherein the means for adjusting the location of the illumination spot relative the central axis of the microlens comprises a control circuit for selecting one of the plurality of liquid crystal elements.

23. A device for displaying a moving three dimensional image from a signal including depth information, the device comprising:

a microlens having a central axis;

a light source adjacent the microlens and positioned to illuminate the microlens at an illumination spot;

means for adjusting the location of the illumination spot relative the central axis of the microlens, said means being responsive to said depth information contained within said signal and comprising a mask intermediate the microlens and the light source having a slit therein.

24. The display device of claim 21 further comprising:

a microlens display plate comprising a transparent plate;

an array of vertical microlenses on a first side of the transparent plate;

a mask on a second side of the transparent plate, the mask having a plurality of slits therein;

an electroluminescent layer on said mask;

an electron beam emitter directed toward the microlens display plate;

an electron beam deflector; and an electron beam controller coupled to the electron beam emitter and the electron beam deflector;

wherein the microlens display plate, electron beam emitter and electron beam deflector comprise a vacuum tube.

25. An apparatus for displaying a three dimensional image on a two dimensional display screen independent of the observer's position, responsive to an image signal including depth information, comprising:

an array of vertical microlenses;

means for controlling the angle of light emission in the horizontal plane for each pixel under the array of microlenses;

means for combining the light emission of each microlens on a horizontal line such that light emitted from the microlens has an apparent source in front of or behind the screen; and means to provide the image under all viewing angles, said means including means for converting the depth information into a periodicity difference, the periodicity difference being the difference between the fixed pitch of a microlens array and the variable pitch of a series of light sources illuminating the microlens array necessary to create an image for the pixel corresponding to the depth information.

26. A method for generating a dynamic three dimensional image from an image signal containing a two-dimensional image signal and a depth information signal, comprising:

providing a microlens array having a first periodicity and having a focal plane;

providing in said focal plane of said microlens array for every point in the two dimensional image an illumination source illuminating several points in common with the same image signal intensity but with a variable periodicity;

varying said variable periodicity of said illumination source in accordance with said depth information signal contained within said image signal.

* * * * *